US006173980B1

(12) United States Patent
Newbold et al.

(10) Patent No.: US 6,173,980 B1
(45) Date of Patent: Jan. 16, 2001

(54) CHILD'S BICYCLE SEAT AND RACK ASSEMBLY

(75) Inventors: Dixon Newbold, Glocester, RI (US); Kenneth Mackenzie, IV, Westport Point, MA (US)

(73) Assignee: Bell Sports, Inc., San Jose, CA (US)

( * ) Notice: Under 35 U.S.C. 154(b), the term of this patent shall be extended for 0 days.

(21) Appl. No.: 08/481,181

(22) Filed: Jun. 7, 1995

Related U.S. Application Data

(63) Continuation of application No. 08/380,256, filed on Jan. 30, 1995, which is a continuation of application No. 08/097,167, filed on Jul. 23, 1993, which is a continuation of application No. 04/415,174, filed on Sep. 29, 1989, now Pat. No. 5,299,818.

(51) Int. Cl.[7] .......................................... B62J 11/00

(52) U.S. Cl. ...................... 280/202; 224/415; 280/288.4; 297/256.15; 297/256.16

(58) Field of Search ................................ 280/202, 288.4, 280/292, 33.993, 33.992, 648, 304.4; D3/213; D6/333; 224/415, 422; 297/4, 19, 20, 285, 377, 378, 243, 487, 256.15, 256.1, 256.16, 250.1, 183.9, 183.3, 183.4, 253, 256.13, 256.17, 354.12, 364, 363, 376

(56) References Cited

U.S. PATENT DOCUMENTS

D. 339,477 * 9/1993 Kain ..................................... D6/333
441,485 11/1890 Greenwood ............................ 224/31
3,138,400 6/1964 Reid .
3,245,717 * 4/1966 Levy ..................................... D6/333
3,802,598 4/1974 Burger et al. ........................ 280/202
3,873,127 3/1975 McNichol, Jr. et al. ............ 280/202
3,902,737 9/1975 Berger et al. ........................ 280/202
4,030,648 6/1977 Johnson et al. ........................ 224/31
4,051,985 10/1977 Berger ................................ 224/32 A
4,053,091 10/1977 Martelet ................................. 224/32
4,085,968 4/1978 Svensson et al. .................... 297/243
4,154,382 5/1979 Blackburn ............................. 224/39
4,195,879 4/1980 Miller .................................. 297/184
4,367,829 1/1983 Kusz ...................................... 224/31
4,440,331 * 4/1984 Schimmels .......................... 280/202
4,592,592 6/1986 Peek .................................... 297/483
4,634,185 * 1/1987 Kassai ................................. 297/487
4,729,600 * 3/1988 Single et al. .................... 297/256.15
4,753,482 6/1988 Warren ................................ 297/458
4,770,468 * 9/1988 Shubin ................................. D6/333
4,830,250 5/1989 Newbold et al. .................... 224/314
4,861,105 * 8/1989 Merten et al. ................. 280/33.993
4,902,070 * 2/1990 Casale ............................ 297/378.12
4,964,551 10/1990 O'Donoval et al. ............... 224/32 A
4,986,599 * 1/1991 Wise ................................... 297/377
4,998,744 3/1991 Drexler ............................... 280/202
5,028,061 7/1991 Hawkes .............................. 280/47.4
5,069,474 12/1991 Tai ...................................... 280/658

FOREIGN PATENT DOCUMENTS 11894 of 1912 (GB) .................................. 280/202
2 136 685 9/1984 (GB) ............................. B60N/1/12
2 163 478 2/1986 (GB) .

OTHER PUBLICATIONS

Rhode Gear Child Seat and Rack advertisement Summer 1990 L.L.Bean Catalog.

* cited by examiner

*Primary Examiner*—Anne Marie Boehler
(74) *Attorney, Agent, or Firm*—Wolf, Greenfield & Sacks, P.C.

(57) ABSTRACT

A novel child's bicycle seat/rack assembly is provided. The seat is capable of slidable attachment to a touring rack of the type including a substantially rectangular frame formed from struts. The seat has integrally-formed channels for slidably engaging the struts and forward and rear integrally-formed, latches adapted to releasably engage the struts so as to lock the seat member against rearward movement relative to the rack. A locking wedge is provided to secure a latch against unintentional flexing and disengagement from the strut. A child's seat may have a seat portion and a back portion pivotably attached to one another. The seat also may have a grab bar and a seat stand.

22 Claims, 17 Drawing Sheets

A
B
28
68
58
74
74
66
67
72
67
54
14
54
67
64
71
35
75
24
62
96
94
100
18
70
92
56
92
80
98

134
132
44
124
112
114
118
120
100
48
136
148
130
130
116
114
122
44
48
122
112
133
150
140
146
138
144
142

316
317
319
442
427
426
420
321
321
319
317
314

416
410
412
412
415
414
415
416
325

413
325
407
442
402
461
460
413
464
466
462
462
400
25
25
448
446
452
413
450
402
413

CHILD'S BICYCLE SEAT AND RACK ASSEMBLY

This application is a file wrapper continuation of application Ser. No. 08/380,256, filed Jan. 30, 1995, which is a continuation of Ser. No. 08/097,167, filed Jul. 23, 1993, which is a continuation in part of Ser. No. 04/415,174 filed Sep. 29, 1989, now U.S. Pat. No. 5,299,818.

BACKGROUND OF THE INVENTION

This invention relates to a child's bicycle seat of the type adapted to be supported on a bicycle rack attached to the frame of a bicycle and supported over a wheel.

Numerous child's bicycle seat and rack assemblies are known in the prior art. Nearly all involve seats which are bolted to rack elements, disengagement of the seat from the rack being troublesome and time consuming. Many of the existing assemblies do not even contemplate the use of the rack without the seat. One rack, that shown in U.S. Pat. No. 4,030,648, shows a seat adapted for sliding engagement with a rack, the seat being snap locked into engagement with the rack. The rack, however, is specially designed and requires a biased element integrally formed in its solid flat platform and an overhang of the platform relative to the side supports for engagement with a channel in the seat.

SUMMARY OF THE INVENTION

It is an object of the invention to provide a child seat that quickly and easily may be detachably secured to a bicycle rack, and in particular, a standard touring rack of the type formed of metal rods or struts.

Another object of the invention is to provide a bicycle seat/rack assembly having a secure seat to rack locking mechanism which is easily and quickly disengaged without removing the rack.

Yet another object of the invention is to provide an improved bicycle seat/rack assembly which allows easy adjustment of the backrest relative to the seat portion.

Still another object of the invention is to provide a bicycle seat of the foregoing type that is simple to manufacture, the rack engagement mechanisms being integrally formed as a part of the bottom of the bicycle seat.

Still another object of the invention is to provide a bicycle seat of the foregoing type that is safe and comfortable.

Still another object of the invention is to provide a bicycle seat of the foregoing type that can be removed from a bicycle rack and placed in a stable upright position on the ground with a child still seated in the bicycle seat.

These and other objects are achieved by the invention which provides a novel child's bicycle seat capable of slidable attachment to a standard touring rack of the type including a substantially rectangular frame having two side struts, a front end strut and a rear end strut. The seat has channels integrally formed in the seat bottom for slidably engaging the side struts and securing the seat against lateral and vertical movement relative the rectangular frame. The seat also has an integrally formed, biased latch adapted to releasably engage one of the front and rear end struts so as to lock the seat member against rearward movement relative to the rack. The biased latch may engage the rear end strut, the front end strut or both. In one aspect of the invention, the biased latch depends downwardly from the bottom of the seat to disengagingly lock with the rear end strut. A locking wedge may be secured between the biased latch and the seat bottom to secure the biased latch in its normally biased position thereby preventing unintentional flexing and disengagement between the latch and the rear end of the strut. When the wedge is removed, the latch may be flexed out of engagement with the rear end strut to allow the seat to be slid rearwardly from the rack.

In another aspect of the invention, a tongue is integrally formed with and projects forwardly of the seat. A biased latch member may be formed in this tongue and be adapted to releasably engage the front end strut so as to lock the seat against rearward movement with respect to the rack. Preferably, the front end strut forms a slot for snugly mating with the tongue to additionally limit forward and vertical movement of the seat with respect to the rack.

In yet another aspect of the invention, the seat bottom includes a pair of L-shaped channels for engaging the side struts of the rack. The rack has a pair of end support struts attached to and downwardly depending from the rear end strut, the support struts being attached inwardly of the side struts to provide clearance for the L-shaped channels.

In yet another aspect of the invention, the child's bicycle seat has a seat portion and a backrest portion pivotably attached to one another by a pair of axially aligned, hub assemblies. The hub assemblies have facing hubs with mating projections and grooves. The hubs may be rotated with respect to one another and locked in various rotational relationships for selectively securing the backrest and seat in various angular relationships to one another. Preferably, the hub assemblies include seat hubs with integrally formed, radially extending arms and backrest hubs with integrally formed, radially extending arms. The seat and backrest arms mate with channels formed in the side walls of the seat portion and backrest to secure the seat portion and backrest to the hub assemblies.

In yet another aspect of the invention, the child seat is provided with a swing element that is movable between a grab bar position and a seat stand position. The swing element and the child's seat are constructed and arranged to permit the swing element to be selectively secured in the grab bar position and the seat stand position. Thus, the rack is provided with a single element that in one position serves the function of a grab bar and in another position serves the function of a seat stand, whereby the child's seat may be removed from the rack and placed on the ground in a stable, upright position still supporting a child. Preferably, the child's seat includes a seat portion and a backrest pivotally attached to one another. Most preferably, the swing-element is U-shaped, with two arms and a bar interconnecting the arms, with the arms attached to the seat portion or backrest.

According to another aspect of the invention, a seat portion for a child's seat of the foregoing type is provided. The seat portion includes a seat base portion for supporting a child and a pair of seat side walls. The seat side walls include a side wall base extending upwardly from the seat base portion and a pair of elongated side supports extending upwardly and rearwardly from the seat base side walls. This seat portion can be used, for example, with a backrest that is pivotally attached to the seat portion. The backrest can have backrest side walls extending toward the seat. The pair of elongated side supports and backrest side walls are constructed and arranged to permit their attachment to one another at at least two positions, thereby defining different pivotal arrangements of the seat and backrest with respect to one another.

The seat portion, backrest and individual hubs all may be injection molded to provide for easy manufacture and assembly of the seat.

DETAILED DESCRIPTION OF THE PREFERRED EMBODIMENT

Figure 1:
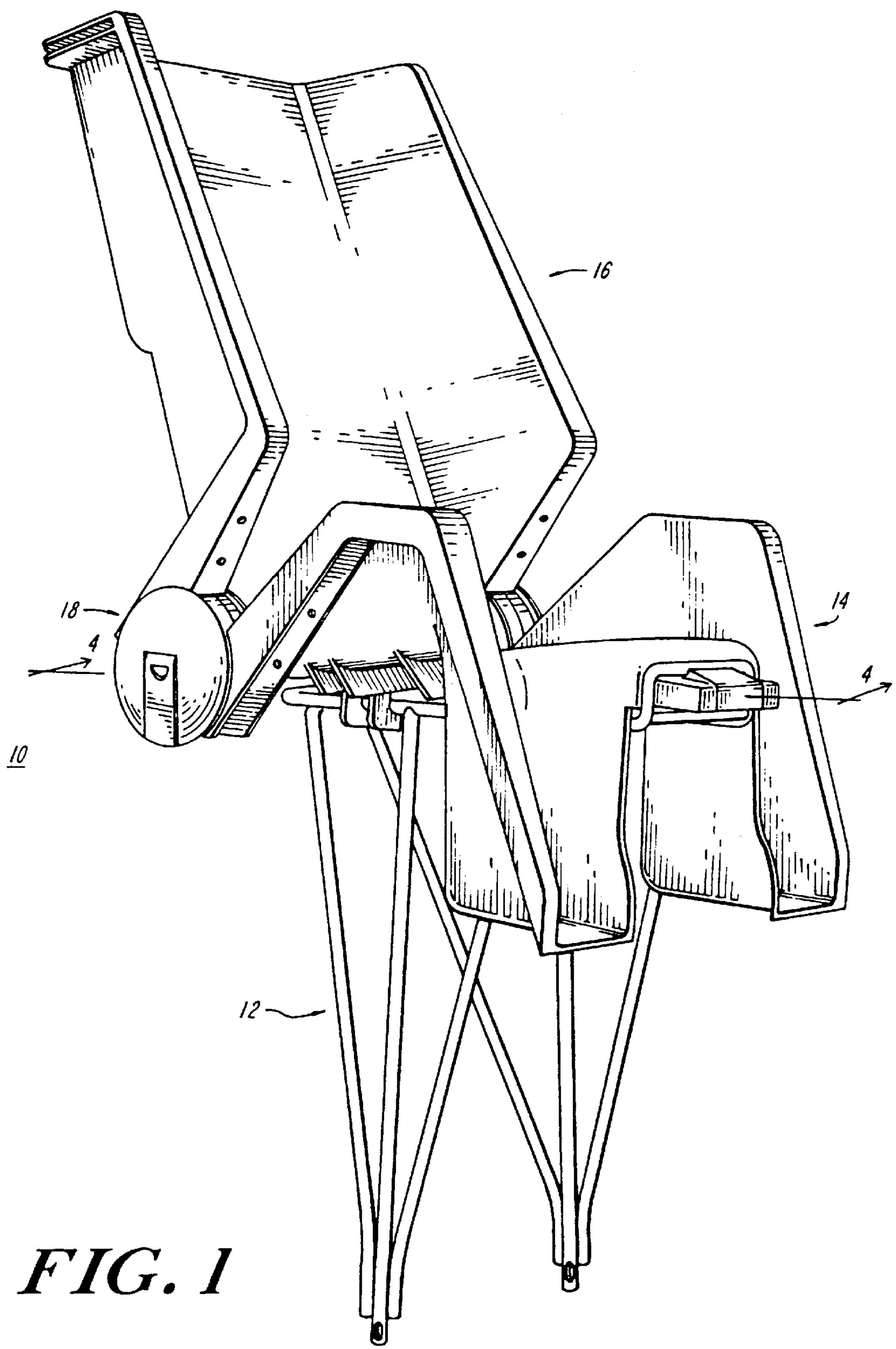
FIG. 1 shows the preferred embodiment of the child's bicycle seat of the invention assembled onto a touring rack.

The preferred embodiment of the child's bicycle seat/rack assembly is depicted in FIG. 1. The assembly includes a seat generally designated 10 and a rack 12 to which the seat is attached. The seat 10 includes a lower seat portion 14 pivotably attached to a backrest 16 by a hub assembly 18. The seat portion 14 includes a horizontal base 20 and base side walls 22 integrally formed with the base and extending substantially perpendicularly to the base 20. The base side walls 22 are substantially in the shape of a trapezoid. A U-shaped reinforcing channel 24 is integrally formed with and defines the edge of each of the side walls 22. Toward the rearwardly facing end of the base 20, the edges of the base side walls 22 slope downwardly. The rearward ends of the U-shaped reinforcing channels 24 are cut-out providing first arcuate grooves 34 for mating with the hub assemblies 18.

A pair of spaced-apart, leg receiving-channels 26 are integrally formed with the seat 10 and depend downwardly from the forward end of the base 20. Extending from the center of the forward end of the base 20 is an integrally formed tongue 28. The tongue 28 includes an integral forward latch 30 depending in its normal, unbiased position upwardly from the top surface 32 of tongue 28. This forward latch 30 may be deflected downwardly upon application of force to become substantially flush with the top surface 32 of the tongue 28.

The seat portion 14 also includes a pair of integral, L-shaped channels 35 depending downwardly from the bottom of the seat portion 14. These channels 35 are constructed and arranged so that they will slidably engage the rack 12, as will be more fully described below.

The backrest 16 includes a back wall 36 and backrest side walls 38. The backrest side walls 38 are integrally formed with the back wall 36 and extend substantially perpendicularly to the back wall 36. The backrest side walls 38 also include integral, U-shaped, reinforcing channels 24 defining the edge of the backrest side walls 38. The lower edge of the backrest side walls 38 are cut-out to form second arcuate grooves 42 for mating with the hub assemblies 18. The upper ends of the backrest side walls 38 and of the back wall 36 define a peripheral, reinforcing, double flange 40. This double flange 40 provides additional reinforcing support to the backrest.

The seat portion 14 and backrest 16 are attached to one another by a pair of axially aligned hub assemblies 18. Each hub assembly 18 includes a seat hub and a backrest hub capable of selective rotation with respect to one another. Each seat hub has extending radially therefrom an integrally formed, seat engaging arm 44. The seat engaging arms 44 are positioned within and securely attached to the U-shaped, reinforcing channels 24 of the seat portion 14 via bolts 46. Each backrest hub similarly includes an integrally formed, backrest engaging arm 48. These arms 48 are positioned within and securely attached to the U-shaped reinforcing channels 24 of the backrest 16 via bolts 46. The seat and backrest engaging arms 44, 48 and the U-shaped, reinforcing channel 24 are provided with mating holes 50 through which the bolts 46 are received.

The rack 12 is of the conventional touring type. The rack 12 includes a first set of struts forming a horizontal platform, generally designated as 52. The horizontal platform includes side struts 54 attached to one another at opposing ends by a rear end strut 56 and a front end strut 58. The front end strut 58 preferably is formed in the shape of a rectangle extending upwardly and perpendicularly to the plane defined by the horizontal platform 52, thereby defining rectangular slot 60. The rack 12 also includes three pairs of struts attached to and downwardly depending from the horizontal platform 52 for engagement with the bicycle frame to support the rack 12. The rear support struts 62 are to the rear end strut 56 inwardly of the side struts 54 to provide clearance for the L-shaped channels 35 when the seat 10 is slid onto the rack 12. A pair of central support struts 64 are attached to and depend downwardly from the mid region of the side struts.

A pair of front support struts 66 are attached to and depend downwardly from the side struts 54 forward of the central support struts 64. The three pair of support struts are attached to one another at their lower extremities. The foregoing rack is known in the prior art and by itself does not form a part of the invention.

Figure 3:
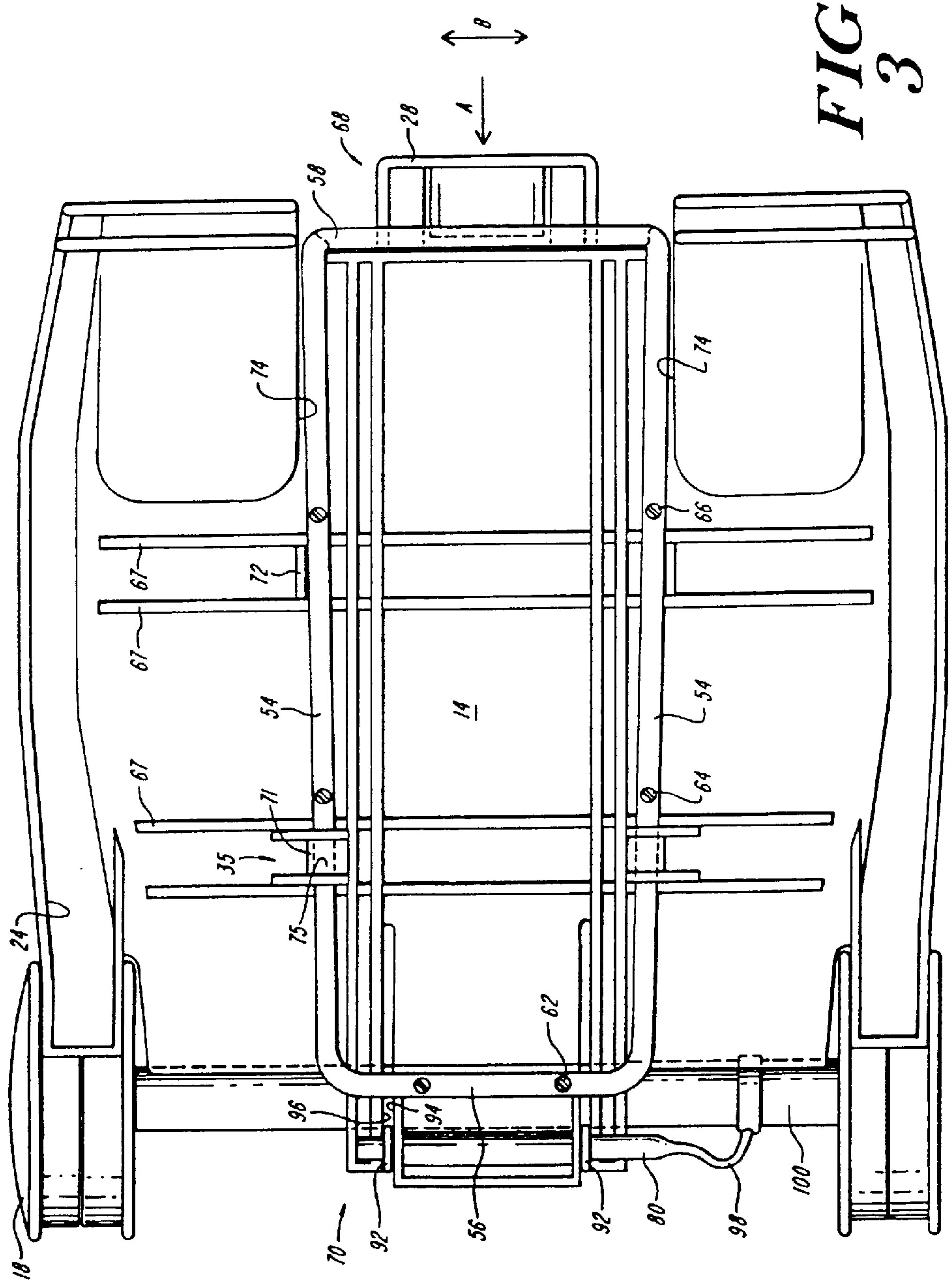
FIG. 3 is a bottom view of the seat/rack assembly of FIG. 1.

FIG. 3 illustrates the attachment of the horizontal platform 52 of the rack 12 to the bottom of the seat portion 14. To provide for better illustration of this attachment, the horizontal platform 52 is only partially depicted, the rear support struts 62, central support struts 64 and front support struts 66 cut-off close to their point of attachment to the horizontal platform 52. The bottom of the seat is shown as having a plurality of integrally formed support ribs 67 for providing structural support and additional strength to the seat portion 14. Such ribs 67 are conventional and do not form a part of the invention.

The seat portion 14 is detachably secured against rearward movement (arrow A) with respect to the rack 12 by a front locking mechanism 68 and a rear locking mechanism 70. The seat portion 14 is restricted against lateral movement (arrow B) with respect to the rack 12 by the engagement of the side struts 54 with the side portion 71 of the L-shaped channels 35, the projecting buttresses 72 and the facing walls 74 of the leg receiving channels 26, all of which are integrally formed with the seat portion 14. The seat portion 14 is restricted against vertical movement with respect to the horizontal platform by the engagement of the bottom portion 75 of the L-shaped channels 35 with the side struts 54 and by the engagement of the tongue 28 with the front strut 58.

The front locking mechanism 68 and the rear locking mechanism 70 may be disengaged from the front end strut 58 and rear end strut 56 respectively, and then the seat portion 14 may be slid rearwardly in direction of arrow A with respect to the rack 12. The L-shaped channels 35 which engage the side struts 54 are capable of sliding off the rearward end of the rack 12 because the rear support struts 62 are attached to the rear end strut 56 inwardly of the side struts 54 to provide clearance for the bottom portions 75 of the L-shaped channels 35 as the seat is slid off the rack. Without this clearance, the bottom portion 75 of the L-shaped channels 35, which bottom portions 75 extend inwardly of the side struts 54, would contact the rear support struts 62 and prevent the seat from being slid onto and off of the rack. The L-shaped channels 35 are positioned on the bottom of the seat portion 14 such that when the rack 12 and seat portion 14 are locked to one another, the L-shaped channels 35 engage the side struts 54 rearwardly of the central support struts 64.

Figure 4:
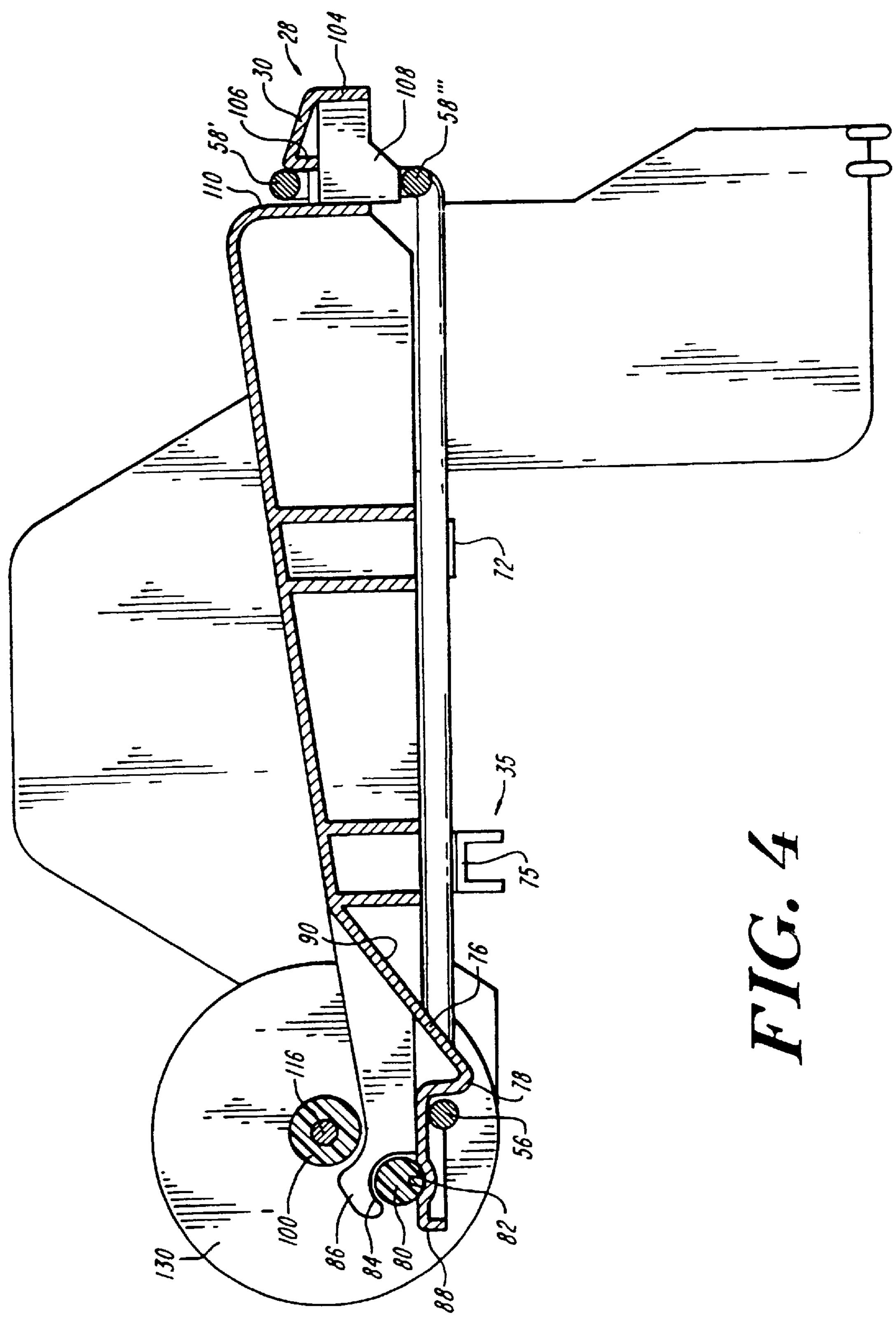
FIG. 4 is a cross-sectional view of FIG. 1 along lines 4—4 showing the locking mechanism attaching the seat to the rack.

The rear locking mechanism 70 is shown in cross-section in FIG. 4. The rear locking mechanism includes a rear biased latch 76 formed integrally with the base 20 of the seat portion 14 and adapted to releasably engage the rear strut 56 via a shoulder 78 to lock the seat portion 14 against rearward movement relative to the rack 12. The rear biased latch 76 in its normal, unbiased position depends downwardly from the bottom of the base 20 toward the rear end of the seat and may be locked in this position against unintentional flexing and disengagement of the shoulder 76 and the rear end strut 56 by a pin 80 which is wedged between the rear biased latch 76 and the base 20 of the seat portion 14. Preferably, the rear biased latch 76 includes a groove 82 on its surface facing the bottom of the seat. A pair of mating grooves 84 are provided on grooved arms 86 integrally formed on the bottom of the seat 10. The transverse groove 82 and the mating grooves 84 cooperate to form a channel for receiving and holding in place the locking pin 80.

Thus, it may be seen that when locking pin 80 is in place, the rear biased latch 76 is not capable of being flexed upwardly toward the bottom of the seat portion 14, and the shoulder 78 of the rear biased latch 76 is secured against unintentional disengagement from the rear end strut 56. When the locking pin 80 is removed, the end 88 of the rear biased latch 76 may be manually forced upwardly toward the seat bottom to lift the shoulder 78 and to bring it above the plane defined by the horizontal platform 52 and out of engagement with the rear end strut 56. Although manual force is needed to disengage the rear biased latch when removing the seat 10 from the rack 12, no such force is necessary when sliding the seat 10 onto the rack 12. As the seat 10 is slid onto the rack 12, the downwardly sloping surface 90 of the rear biased latch 76 contacts the rear end strut 56 which causes the latch 76 to flex upwardly toward the seat bottom. When the shoulder 78 passes beyond the rear end strut 56, the rear biased latch 76 snaps downwardly toward its normal unbiased position and into engagement with the rear end strut 56.

Figure 5:
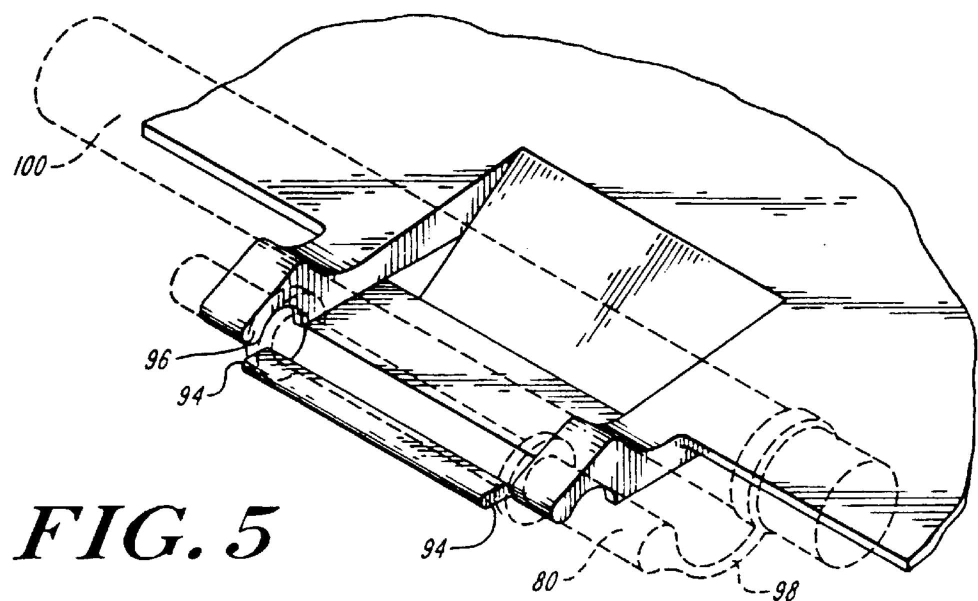
FIG. 5 is a rear view of FIG. 1 showing a latch and locking-pin assembly for attaching the seat to the rack.
Figure 6:
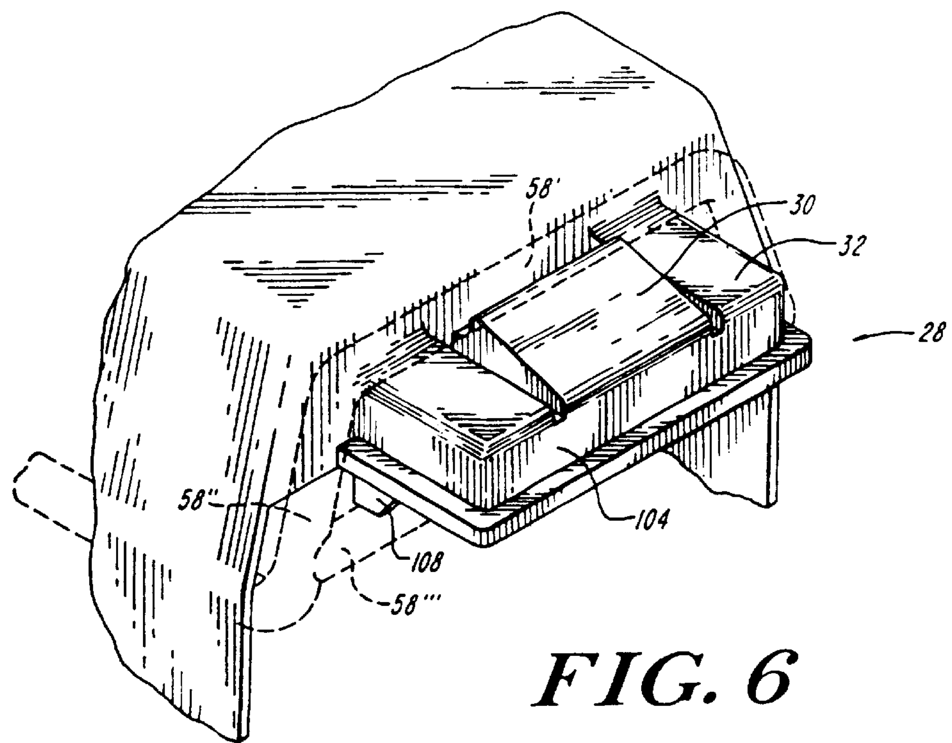
FIG. 6 is a front view of FIG. 1 showing a tongue, slot and latch assembly for attaching the seat to the rack.

Referring to FIG. 5, the side walls 94 of the rear biased latch 76 are spaced from the facing side walls 96 of the grooved arms 86. The locking pin 90 may be provided with annular ridges 92 sized and positioned to be captured in the space between the side walls 94 of the rear biased latch 76 and the facing side walls 96 of the grooved arms 86. The engagement of the annular ridges 92 and the side walls 94, 96 prevents the locking pin 80 from sliding axially with respect to the rear biased latch 76. The locking pin 80 is loosely attached to the axle cover 100 by a safety cord 98, thereby preventing inadvertent loss of the locking pin 80.

The front locking mechanism 68 includes the engagement of a tongue 28 and the front end strut 58 to limit vertical, forward and rearward movement of the seat relative to the rack. The tongue 28 has an integral, front, biased latch 30. This front biased latch 30 in its normal unbiased position depends upwardly from the leading end 104 of the tongue 28 toward the rear end of the seat and terminates in a downwardly extending shoulder 106 for engaging the strut 58 and limiting rearward movement of the seat 10 with respect to the rack 12. The front biased latch 30 may be manually flexed downwardly until it is substantially flush with the top surface of the tongue 28. This action moves the shoulder 106 out of engagement with the front end strut 58 and allows the tongue 28 to be moved rearwardly with respect to the front end strut 58. No such manual force is required when sliding the seat 10 onto the rack 12. As the seat 10 is slid onto the rack 12, the upwardly sloping surface of the front biased latch 30 contacts the front end strut 58 and flexes downwardly. When the shoulder 106 has passed beyond the front end strut 58, the front biased latch 30 snaps upwardly toward its normal unbiased position and into engagement with the front end strut 58.

In the preferred embodiment, the front end strut 58 has an upper portion 58', side wall portions 58" and a lower portion 58"', which together form a substantially rectangular slot receiving the tongue 28. The tongue 28 may include dogs 108 positioned rearward of its leading end 104, which dogs 108 provide the tongue 28 with a gradually increasing vertical dimension in a direction rearwardly of the leading end 104 of the tongue 28. The leading end 104 of the tongue 28 then is easily passed into the slot formed by the front end strut 58 as there is ample clearance between the vertical dimension of the front end 104 of the tongue 28 and the vertical dimension of the slot. When the tongue is advanced further into the slot, however, the increased vertical dimension of the tongue 28 provided by the dogs 108 results in a snug fit between the tongue 28 and the slot. The upper portion 58' of the front strut 58 then engages the top surface of the tongue 28 and prevents upward movement of the seat 10 relative to the rack 12. The side and upper portions 58", 58' of the front strut 58 abut the leading end 110 of the seat portion 14 to restrict forward movement of the seat 10 relative to the rack 12.

Figure 12:
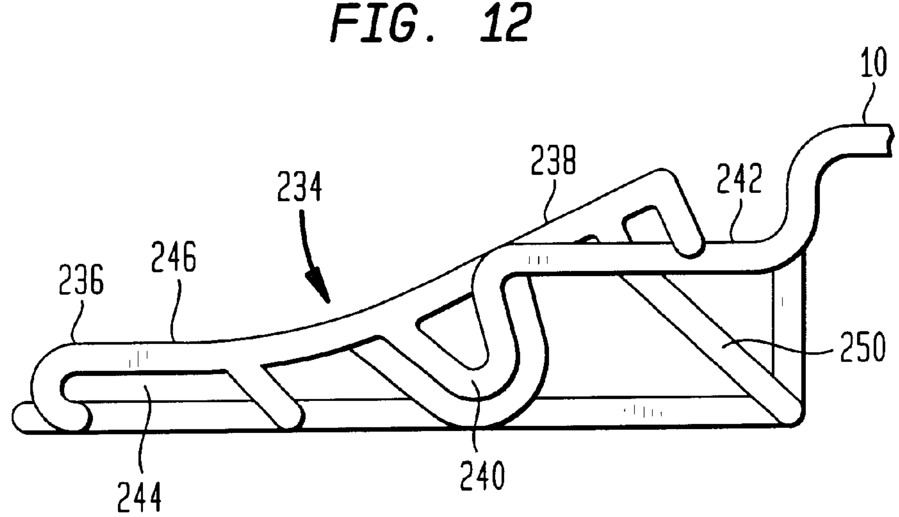
FIG. 12 is a cross-sectional view of the tongue assembly of FIG. 11 along lines 12—12.

A second embodiment of the tongue 28, identified as tongue 228, is illustrated in FIGS. 9 to 13. (FIGS. 9 and 10 also show a second and preferred embodiment of the child seat, discussed in detail below.) Tongue 228 comprises a base portion 230, integral with the bicycle seat 10, defining a pair of spaced parallel legs 232 extending away from the bicycle seat 10. The tongue 228 also includes a forward T-shaped latch 234 having a lever section 236 (corresponding to the top of the "T") and a perpendicularly extending securing portion 238 (corresponding to the base of the "T"). The lever section 236 is integral with the base legs 232 and the securing portion extends toward the seat and lies centered substantially between the base legs. As illustrated in FIG. 12, the latch 234 is slightly convex.

The lever section 236 meets the base portion legs 232 at a pair of living hinges 240. The narrowed region of the living hinges 240 are flanked by facing surfaces of the legs 232 and lever section 236, defining a V-shape. Also, a pair of arches 241 are preferably disposed on either side of the V-shape to provide further flexibility to the hinges 240.

In its unbiased position, the lever section 236 angles slightly upward from the base portion 230. The securing portion 238 in turn extends in its normal unbiased position upwardly between the legs 232 and above the top surface 242 of the tongue base portion 230.

Lever section 236 provides a means for lowering the securing portion 238 out of its strut engagement position and into coplanar alignment with the tongue top surface 242. As the lever section 236 is raised, it pivots along the living hinges 240 with respect to the tongue base portion 230, causing the securing portion 238 to lower between the legs 232. The upward movement of the lever section 236 is limited by contact of the facing surfaces of the legs and lever section. Additionally, the lever section 236 is sufficiently sized so as to provide both finger gripping space along its underside 244 and a top surface 246 to accommodate the user's palm. This system differs from the first embodiment where a downward force must be applied directly to the latch 30 to disengage the seat 10 from the rack 12.

A lever arm 250 may also be provided as an integral part of the latch 234. The lever arm 250 is constructed and arranged to engage a strut and urge the seat rearwardly off the rack when the lever section 236 is biased upwardly.

The lever arm 250 extends downwardly and rearwardly from the bottom of the securing portion 238. The lever arm 250 preferably does not extend below the bottom of the tongue base portion 230 when the latch is unbiased, otherwise the lever arm 250 may interfere with the rack struts as the seat 10 is initially secured onto the rack 12. When the bicycle seat 10 is secured onto the rack 12, the lever arm 250 preferably rests proximal to the backside of the lower portion 58''' of the front end strut 58.

Figure 13:
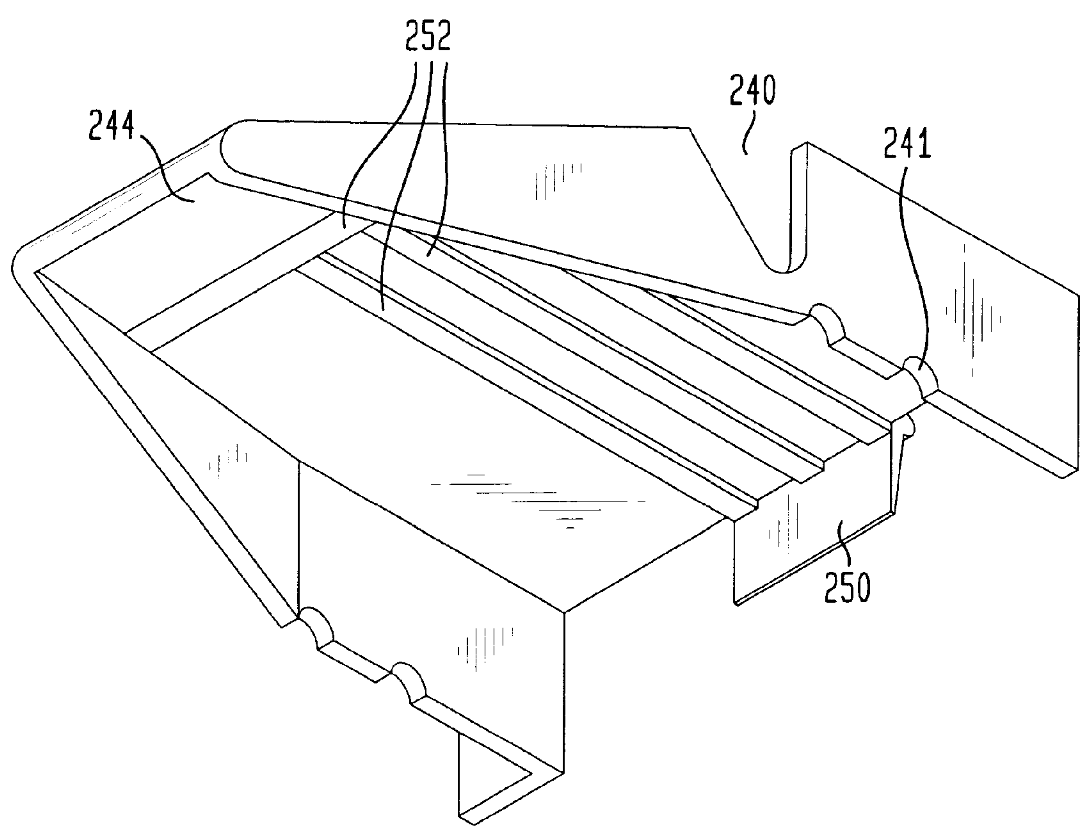
FIG. 13 is a perspective view of the tongue assembly of FIG. 11 from below.

The lever arm 250 is further supported by a plurality of beam-like structures 252 secured along the underside of the tongue 228. These structures 252 are best illustrated in FIG. 13. This arrangement increases the stress that may be endured by the lever arm 250 when urged against the strut lower portion 58'''.

When the lever section 236 is urged upwardly and the securing portion 238 is consequently lowered, the lever arm 250 is urged forwardly and into contact with the strut lower portion 58''', thereby forcing the seat 10 rearwardly. It will be understood that the lever arm 250 is spaced somewhat from contact with the strut lower portion 58''' when the seat is positioned upon the rack with the securing portion 238 engaging the upper portion of strut 58. In this manner, when the lever section 238 is urged upwardly, the securing portion 238 is moved sufficiently downwardly to provide clearance prior to the lever arm 250 contacting the strut lower portion 58''' and urging the seat rearwardly. Preferably, no significant force is required to raise the lever section 236 until the securing portion 238 clears the upper portion. The lever arm 250 then can provide a centralized releasing sensation to the user, such that maximum force is applied when substantial resistance occurs. The seat 10 then seems to break free from the rack 12. The additional rearward force acts as both a guide and lever in assisting removal of the seat 10 from the rack 12.

The seat portion 14 and backrest 16 are attached to one another by hub assemblies 18 which allow the seat portion 14 and backrest 16 to be selectively positioned at various angles with respect to one another. Each hub assembly includes a pair of adjacent hubs, a seat hub 112 and a backrest hub 114 axially aligned on an axle 116 for selective rotation with respect to one another. The facing surfaces of the seat hub 112 and backrest hub 114 include mating hub ridges 118 and hub grooves 120 which allow the seat hub 112 and backrest hub 114 to be locked in various rotational positions with respect to one another when the hub ridges 118 and hub grooves 120 are engaged. The backrest hub 114 preferably is provided with a stop 122 which, when the hubs are assembled on the axle, mates with a hub channel 124 in the seat hub 112. The stop 122 moves in the hub channel 124 as the hubs 112, 114 are rotated with respect to one another on the axle 116. The ends of the hub channel 124 engage the stop 122 and limit absolutely the extent of rotation of the seat hub 112 and backrest hub 114 with respect to one another. In the preferred embodiment, a relative rotation of about 20° is allowed.

The seat hub 112 includes a seat hub arm 44 integrally formed with and radially extending from the seat hub 112. The backrest hub 114 likewise includes a backrest hub arm 48 integrally formed with and radially extending from the backrest hub 114. These arms are constructed and arranged to fit within the U-shaped reinforcing channels 24 on the seat portion 14 and backrest 16 to attach the seat portion 14 and backrest 16 to the hub assembly 18.

A pair of end plates are positioned on the axle 116 and sandwich the seat hub 112 and backrest hub 114. The end plates cooperate with other features of the hub assembly to hold the seat hub 112 and backrest hub 114 in locking engagement with one another. The portion of the axle 116 positioned between the two inner end plates 130 is surrounded by an axle cover 100. The ends of this axle cover 100 abut the facing surfaces of the inner end plates 130 and restrict the movement of the inner end plates 130 toward one another. At one end of the axle is an integrally formed bolt-shaped axle head 134 which acts as a stop to prevent the adjacent outer end plate 132 from sliding off of the axle head end of the axle 116. The axle head 134 is of conventional octagonal shape and mates with a groove in the adjacent outer end plate 132 so that rotation of this outer end plate translates rotation to the axle 116. The opposite end of the axle 116 has terminal threads 136 provided to mate with an internally threaded tab axle 140 in release tab 138. The release tab acts as a stop to prevent the adjacent outer end plate 133 from sliding off of the tab end 142 of the axle 116.

The release tab 138 fits within a groove in the outer end plate 133. Rotation of the outer end plate 133 translates rotation to the release tab 138.

Figure 2:
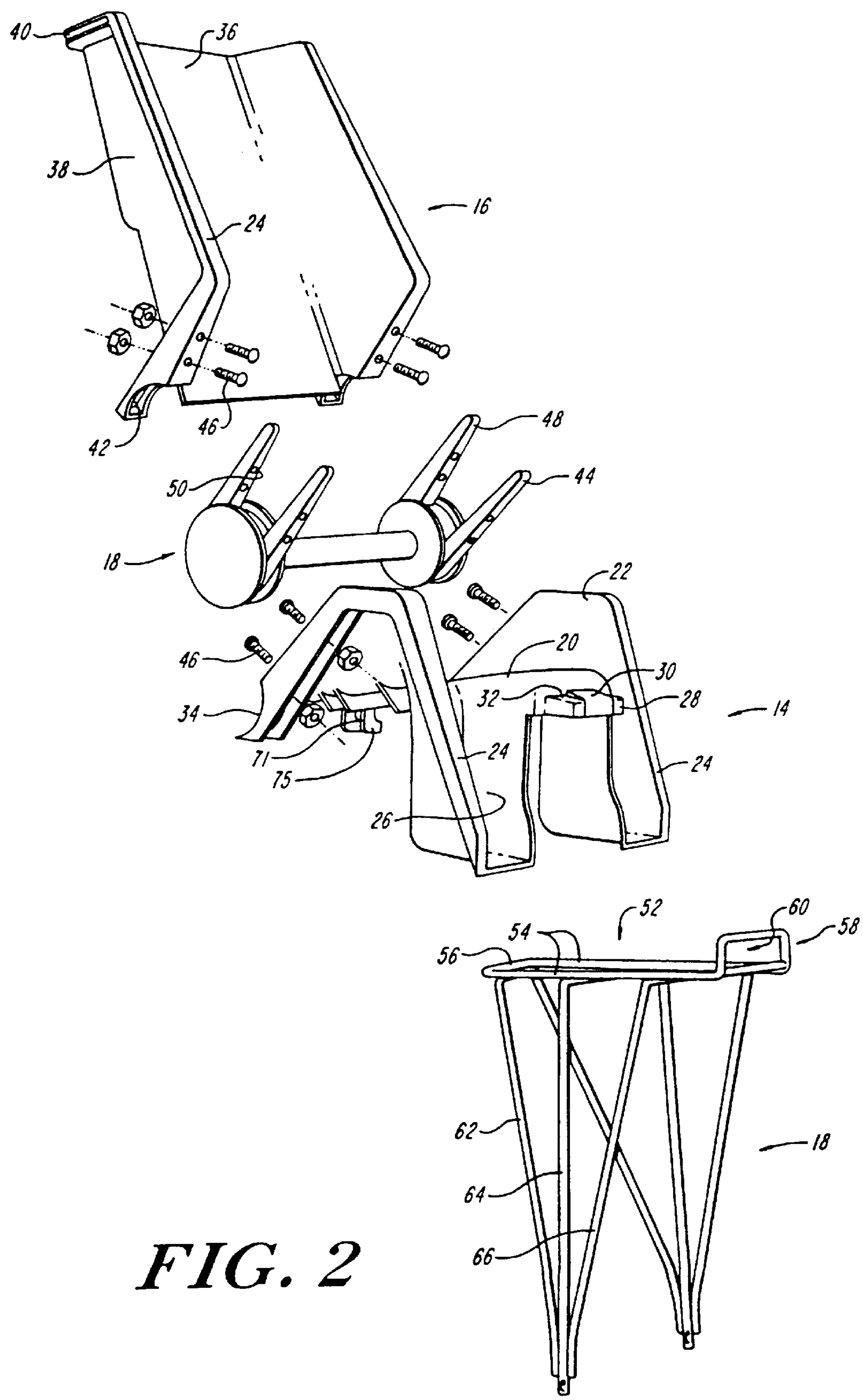
FIG. 2 is a partially exploded representation of FIG. 1.

When the hub assembly is assembled as shown in FIG. 2, the outer end plate 133 and its release tab 138 are tightly threaded onto the axle 116. Seat and backrest hubs 112, 114 are sandwiched by the inner and outer end plates 130, 132, 133. The outer end plates 132, 133 exert an inwardly directed force to hold the facing surfaces of the seat and backrest hubs 112, 114 in locking engagement, the hub arms 44, 48 fixed in selective angular relationship to one another.

The release tab 138 is pivotable on the tab axle 140 secured within the groove on the outer end plate 133. When the bottom 142 of the release tab 138 is pivoted outwardly on tab axle 140, the inner end 144 of release tab 138 is aligned with a channel 146 in the outer end plate 133 and the outer end plate 133 is allowed to move slightly outwardly, thereby releasing some of the inwardly directed force holding the hubs together. The outer end plate 133 with attached release tab 138 then may be rotated easily to cause the release tab to be threaded toward the tip 148 of the axle 116. This effectively lengthens the axle and allows the seat and backrest hubs 112, 114 to be disengaged from their locking engagement and rotated with respect to one another. The seat rest portion 14 and backrest 16 then are allowed to pivot with respect to one another by the relative rotation of the seat hubs and backrest hubs. When the seat portion 14 and backrest 16 are positioned in the desired angular relationship, the outer end plates are rotated with respect to one another to thread the release tab 138 further onto the axle and thereby bring the outer end plates 132, 133 toward one another. Since the inner end plates 130 are fixed against inward movement toward one another by the axle cover 100, the inward movement of the outer end plates 132 forces the seat and backrest hubs 114, 116 toward one another into locking engagement. The bottom 142 of the release tab 138 then is pivoted inwardly to provide further locking force, the inwardly facing wall 150 of the release tab 138 acting as a lever against the groove wall 152 of the outer end plate 133 to force the outer end plate inwardly.

The seat portion 14, backrest 16, seat hub 112, backrest hub 114, inner end plates 130 and outer end plates 132, 133 each may be integrally molded as a single piece. In the preferred embodiment, the seat portion 14 and backrest 16 are molded from polypropylene. The various elements of the seat portion 14 and backrest 16 must be thick enough to provide support and strength, but thin enough to prevent deformation when cooling during the molding process (as is known to those of ordinary skill in the art). The thickness of the various elements ranges from about 2.5 mm to about 4 mm. The front end latch 30 has a thickness of about 2.5 mm, while the rear biased latch has a thickness of about 3 mm. The typical thickness of the U-shaped reinforcing channels 24, support ribs 67 and L-shaped channels 35 also is on the order of about 3 mm. The double flange 40 has a thickness of about 4 mm.

The seat and backrest hubs 112, 114 and the end plates 130, 132, 133 in the preferred embodiment are made from glass reinforced nylon, a rigid material. The axle 116 is metal. The rack 12 preferably is formed of aluminum rods. The central support struts 64 of the preferred embodiment have a diameter of about ⅜ of an inch and the remaining struts have a diameter of about 5/16 of an inch.

A second embodiment of the bicycle seat 310 is adapted for use with a swing element 312 which acts as both a grab bar and seat stand. For preferred operation of the swing element 312, minor modifications to the seat 10 are required. To avoid confusion, the modified seat, illustrated in FIGS. 9, 10, and 14–25 is labelled 310. All corresponding elements have been given "300" series numbers where possible.

Figure 14:
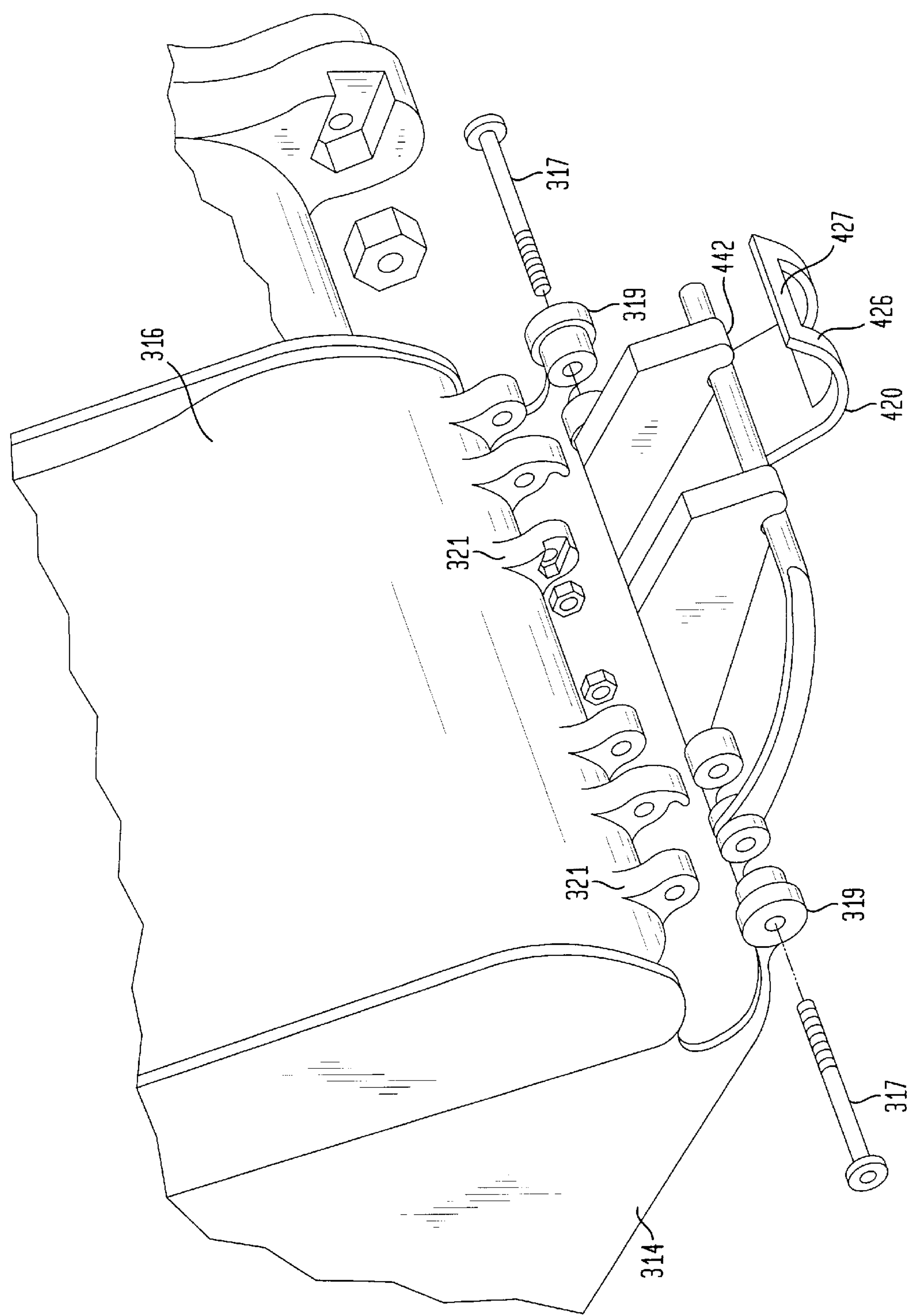
FIG. 14 is a pre-assembly view of the seat hinge arrangement.

The seat 310 includes a lower seat portion 314 pivotally attached to a backrest 316 along a pair of pivot screws 317 (FIG. 14). The pivot screws 317 pass through a series of loops 319 and 321 integrally molded and extending from the seat portion 314 and the backrest 316 respectively, similar to a standard hinge arrangement. The seat portion 314 and the backrest 316 are integrally molded as a single piece, connected by a thin piece of plastic which folds upon itself when the loops are brought together as a hinge.

The seat portion 314 includes a horizontal base 320 and base side walls 322 integrally formed with the base 320 and extending substantially perpendicularly to the base 320. A U-shaped reinforcing channel 324 is integrally formed with each of the side walls 322. Toward the rearwardly facing end of the base 320, the base side walls 322 slope downwardly. The U-shaped reinforcing channels 324, however, extend upwardly and rearwardly from the side walls 322 in a concave path to form elongated side supports or side arms 325. The side arms 325 are slidably attached to the backrest 316 as will be more fully described below.

The backrest 316 includes a back wall 336 and backrest side walls 338. The backrest side walls 338 are integrally formed with the back wall 336 and extend substantially perpendicularly to the back wall 336, generally toward the seat portion. The backrest side walls 338 also include a continuous, integral, U-shaped, reinforcing channel 339 defining the edge of the backrest side walls 338 and extending over the top of the back wall 336.

The reinforcing channel 339 has receiving holes 341 shaped to accommodate the side arms 325. The dimensions of each hole 341 are preferably slightly wider than the width of the side arm 325, and taller than the height of the side arm 325. The position of the side arm 325 within the hole 341 depends upon the pivotal relationship of the backrest with respect to the seat portion. The dimensions of the hole 341 should accommodate all possible positions of the backrest with respect to the seat portion.

In the preferred embodiment, the base side walls 322 and, more particularly, the side arms 325 are molded so that one must squeeze the arms 325 toward one another to insert the arms 325 into the holes 341. The arms 325 then urge against the outside edge 342 of the holes 341 when the seat 310 is assembled.

The side arms 325 are slidably mounted to the backrest 316 along backrest side walls 338 by a toggle assembly 343. This is illustrated in FIGS. 10 and 15–21. The toggle assembly 343 (FIGS. 15–18) includes, in series, a nylon nut 345, a rotating barrel 347, a toggle or cam 349, a stand off member 351, a travelling washer 353, and a hexagonal head bolt 355. The bolt 355 passes through each other element of the toggle assembly 343 and is secured at its threaded end 357 within the nut 345. The head 359 of the bolt 355 is secured within the washer 353. A substantial portion of the stand off 351 is disposed within the side arm 325 while a small portion 361 extends beyond the side arm 351. The cam 349 pivots on a concave mating surface 362 on the exposed portion 361.

The cam 349 comprises a rounded eccentric region 363 with an integral flat backing 365 having a curved finger engaging portion 367. The eccentric region 363 is shaped so that its width perpendicular to the backing 365 is longer than the width parallel to the backing 365. A slot 369 is defined along the eccentric region 363 and is in communication with a hole 364 in the backing side 365. The slot 369 permits the cam 349 to rotate 90° from a vertical position to a horizontal position.

On the backing side 365 of the cam 349, a rounded recessed region 370 is shaped to receive the rounded rotating barrel 347 against and in coaxial alignment with the hole 364. The barrel 347 in turn is shaped to receive the nut 345. The recessed region 370 should have a depth to permit the full 90° rotation of the cam 349 without nonlinear displacement of the nut 345, the barrel 347, or the screw 355 which is received by both. In other words, as the cam 349 is pivoted on its eccentric region 363, the screw 355 is only axially displaced. The cam 349 also rotates around the rounded barrel 347.

The stand off 351 is cylindrically shaped to receive the bolt 355. The cam 349 pivots on the mating surface 362 on the stand off exposed end 361 while the other end of the stand off 351 is secured within the side arm 325 coaxial with a screw receiving hole 371 in the side arm 325.

The travelling washer 353 is partially disposed within a slot 372 in the side wall 338. Slot 372 extends along a length and has a uniform height, except for a plurality of facing arches 384 disposed at discrete locations along the length. The distance between the apexes 386 of facing arches 384 is greater than the height of the slot 372.

The washer 338 has a face 377 with a raised portion 378. The raised portion 378 has a height slightly less than the height of the slot 372. The raised portion 378 also has a pair of opposite preferably concentric arches 388 for keyed or mating engagement with the slot arches 384. These arches define a height that is slightly greater than the uniform height of the slot 372, but slightly less than the height of the facing arches. The raised portion 378 is disposed within the slot 372, while the washer face 377 lies in flush contact with the inner side 374 of the side wall 338. When the washer 353 is moved along the length of the slot 372, it encounters friction or interference when the raised arch portions 388 are forced through the narrower slot height. The bicycle seat material (plastic), however, has some resiliency so that sliding the side arm 325 is possible. It is expected that after repeated uses, the interference will be reduced, if not eliminated. In the meantime, however, once the raised portion 378 is aligned with the mating arch configuration of the slot 372, the user will sense a definitive snap as the interference is alleviated.

Figure 20:
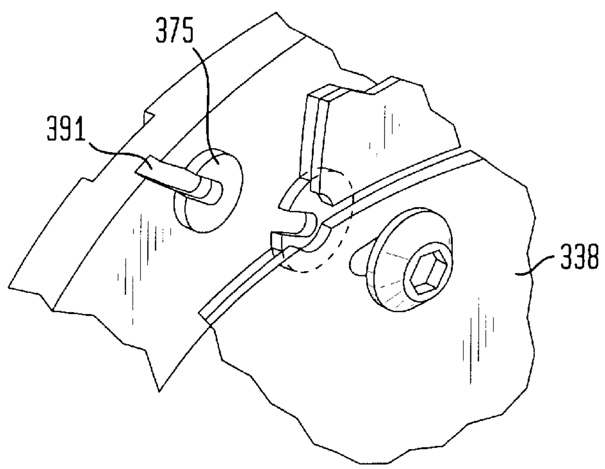
FIG. 20 is an exploded view of the washer, slot, and side arm.
Figure 21:
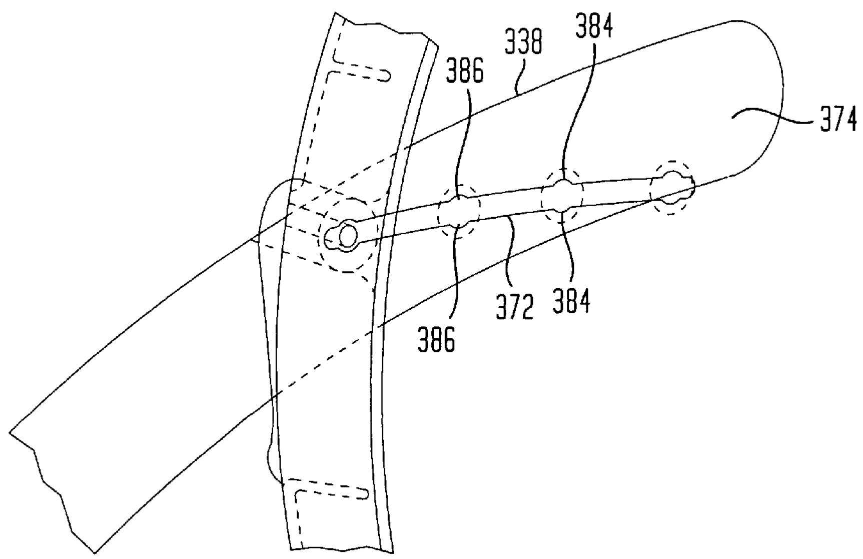
FIG. 21 is a plan view of the slot from within the seat back.

As illustrated in FIG. 20, the side arm 325 has a raised area 375 shaped to selectively engage a plurality of circular depressions 376 in the exterior side 392 of the side wall 338. Each depression 376 is concentric with a pair of opposing slot arches 384. The depressions provide a snap engagement of the side arm 325 with the side wall 338. Groove 391 in the raised area 375 is desirable for molding purposes which are well-known in the art.

Figure 15:
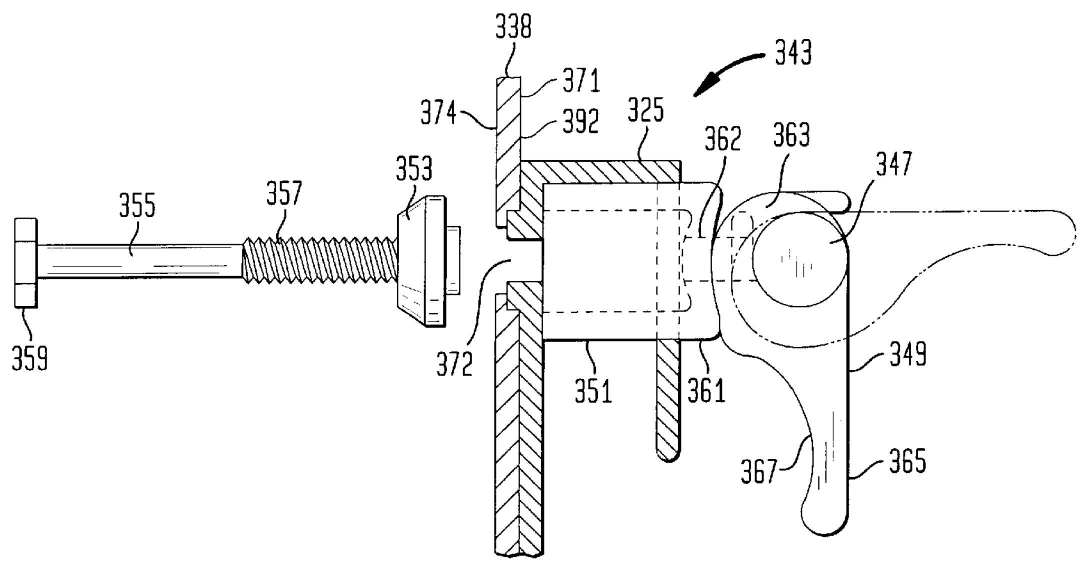
FIG. 15 is a partially exploded cross-sectional view of the toggle assembly.
Figure 16:
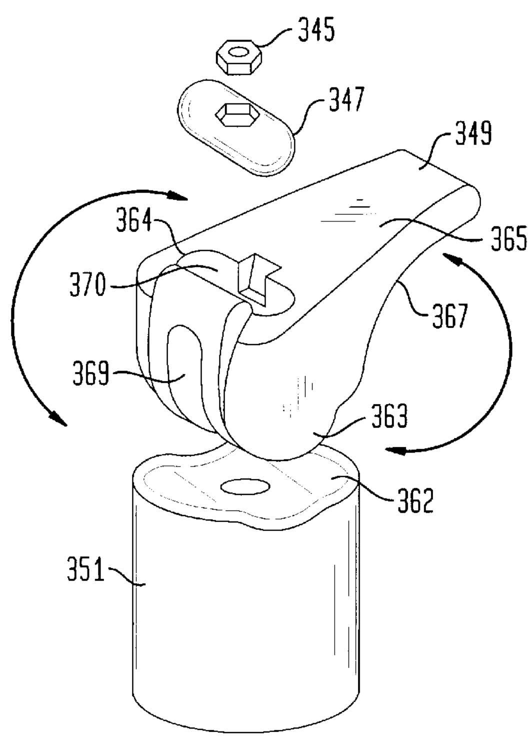
FIG. 16 is a detailed exploded view of the toggle assembly of FIG. 15.
Figure 17:
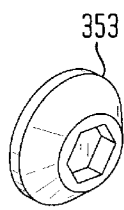
FIG. 17 is a detailed perspective view of the travelling washer.
Figure 18:
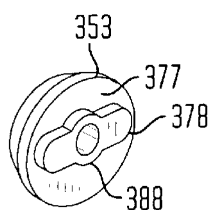
FIG. 18 is a second detailed perspective view of the travelling washer.
Figure 19:
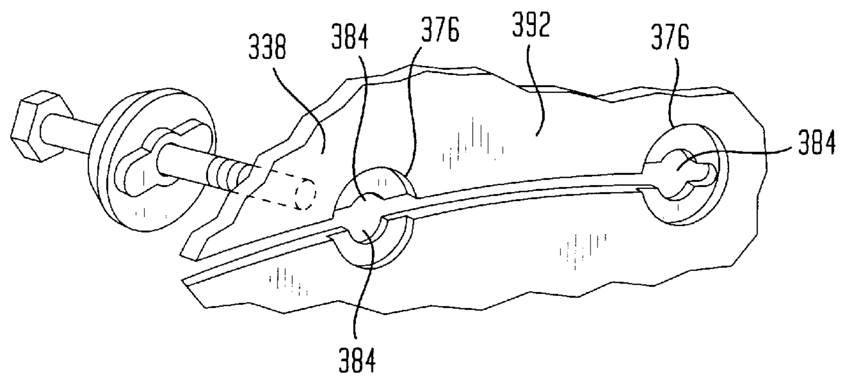
FIG. 19 is an exploded view of the washer and slot assembly.

The toggle arrangement 343 is tightened during assembly by threading the nut 345 onto the screw 355. This is accomplished by rotating the cam 349 in a plane coaxial with the screw 355. It is preferable that the desired tension in the toggle assembly 343 result when the finger engaging portion 367 extends downwardly as shown in FIG. 15 and with the eccentric region 363 disposed on the mating surface 362 of the stand off 351.

In use, when the cam 349 is in the locked position, the side arms 325 are forced against the side walls 338 with the raised area engaging a depression, thereby locking the side arms to the backrest at a particular position. In addition, the child seat is constructed so that the side arms 325 are no longer in contact with the outside edges 342 of the holes 341. Instead, the camming operation forces the arms 325 further inwardly, out of contact with those edges. When the cam 349 is rotated or pivoted on the stand off 351 into the horizontal unlocked position, the side arms 325 spring outward against the hole edge 342, permitting the raised area 375 on the side arm 325 to loosen from engagement with the depression 376 in the side wall 338. Preferably, the raised area 375 remains in very slight contact with or just barely clears the exterior 392 of the side wall 338 as the raised area 375 is transferred from one depression 376 to another. This preferred arrangement provides the user a snap-style indication of engagement of the side arm 325 in one of the discrete positions.

Figures 22, 23:
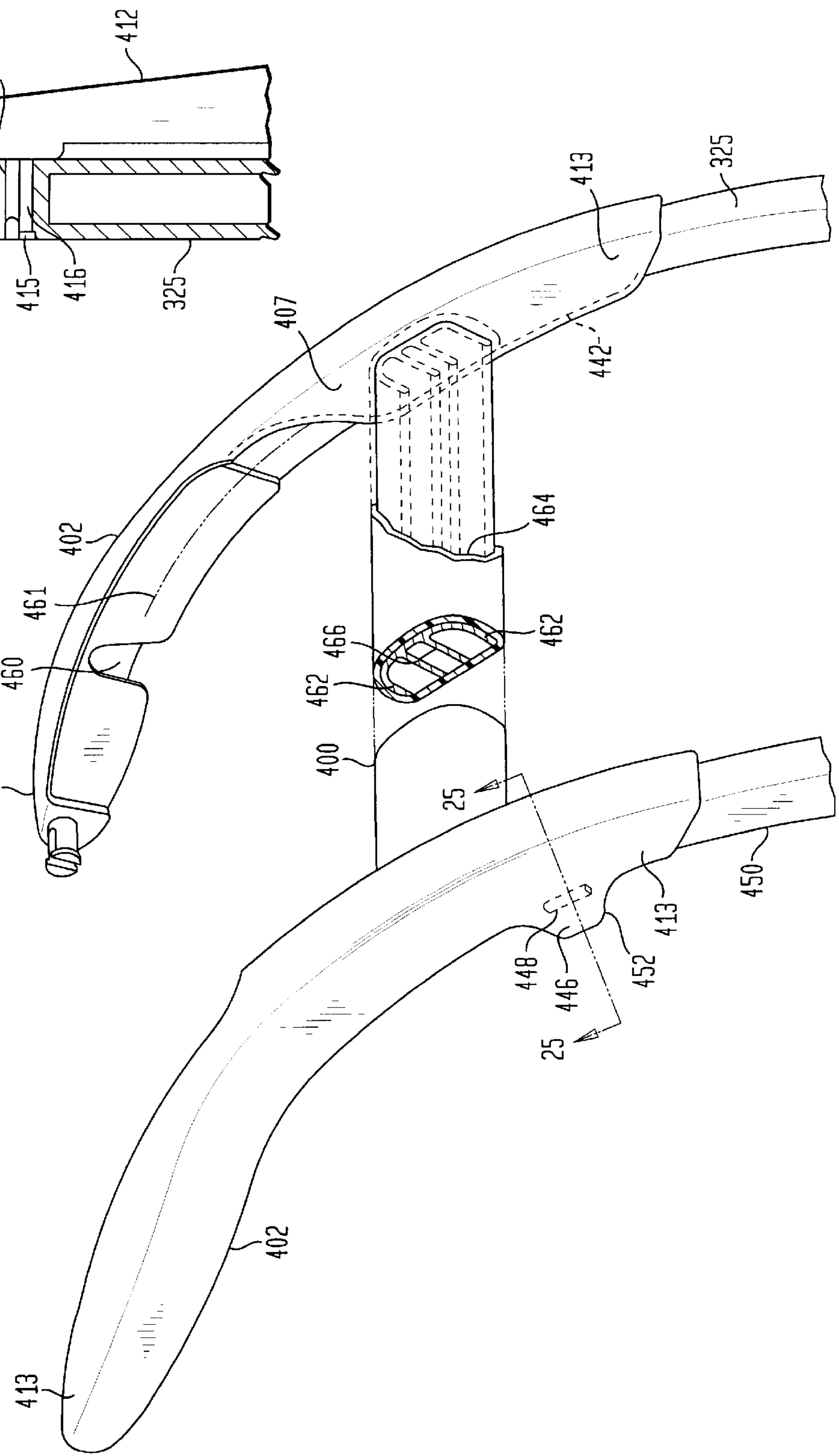
FIG. 22 is a detailed partial cross-sectional view of the swing element.
FIG. 23 is a cross-sectional view of the pivot assembly.
Figure 24:
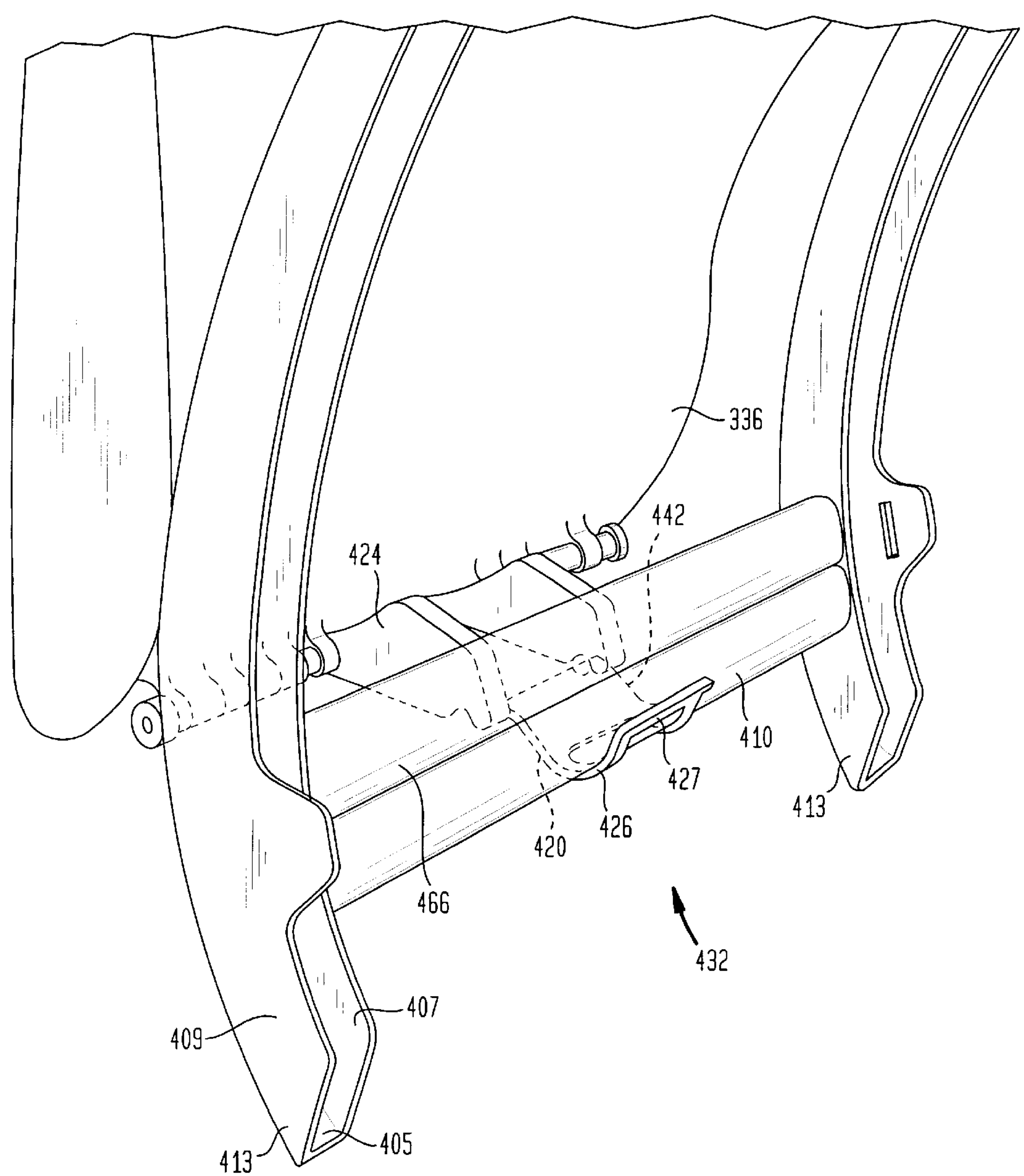
FIG. 24 is a detailed perspective view of the swing element locked in the seat stand position.

Swing element 312 comprises a cross-bar 400 extending between and integrally connected to a pair of substantially parallel, arcuate, swing arms 402 (FIG. 22). The swing arms 402 are substantially U-shaped and define a channel 405 having side walls 407 and 409, and connecting wall 411 (FIG. 24). The cross-bar 400 is secured proximal to ends 413 of the swing arms 402 so that the swing element 312 may pass over the height of the backrest 316. The opposite ends 404 of the swing arms 402 are in turn pivotally secured to the side arms 325.

The pivot assembly 406 connecting the side arms 325 to the swing arms 402 may be best seen in FIG. 23. Assembly 406 comprises a unilateral locking joint 410 having a plurality of radially arranged flexible stems 412. The stems 412 are each capped by an outwardly extending projection 414 which provide the locking joint 410 a diameter greater than the receiving hole 416 on the side arm 325. The projections 414 are captured in the side arm 325 along a recesses 415 shaped to create a snap fit arrangement after the stems 412 are passed through the hole 416.

The pivot point for the swing element 312 is preferably chosen at a relatively rearward location. The rearward location of the pivot point as illustrated allows the swing element 312 to provide ample clearance during rotation over a seated child wearing a bicycle helmet for all positions of the backrest.

The swing element 312 functions in two primary positions. When the swing element 312 is secured behind the seat 310, see FIGS. 10 and 24, it provides support to stabilize the seat 310 when placed on a surface such as the ground. On the other hand, when the swing element 312 is secured in the front of the seat 310, see FIG. 9, the swing element 312 provides a grab bar for the child occupant.

Figure 10:
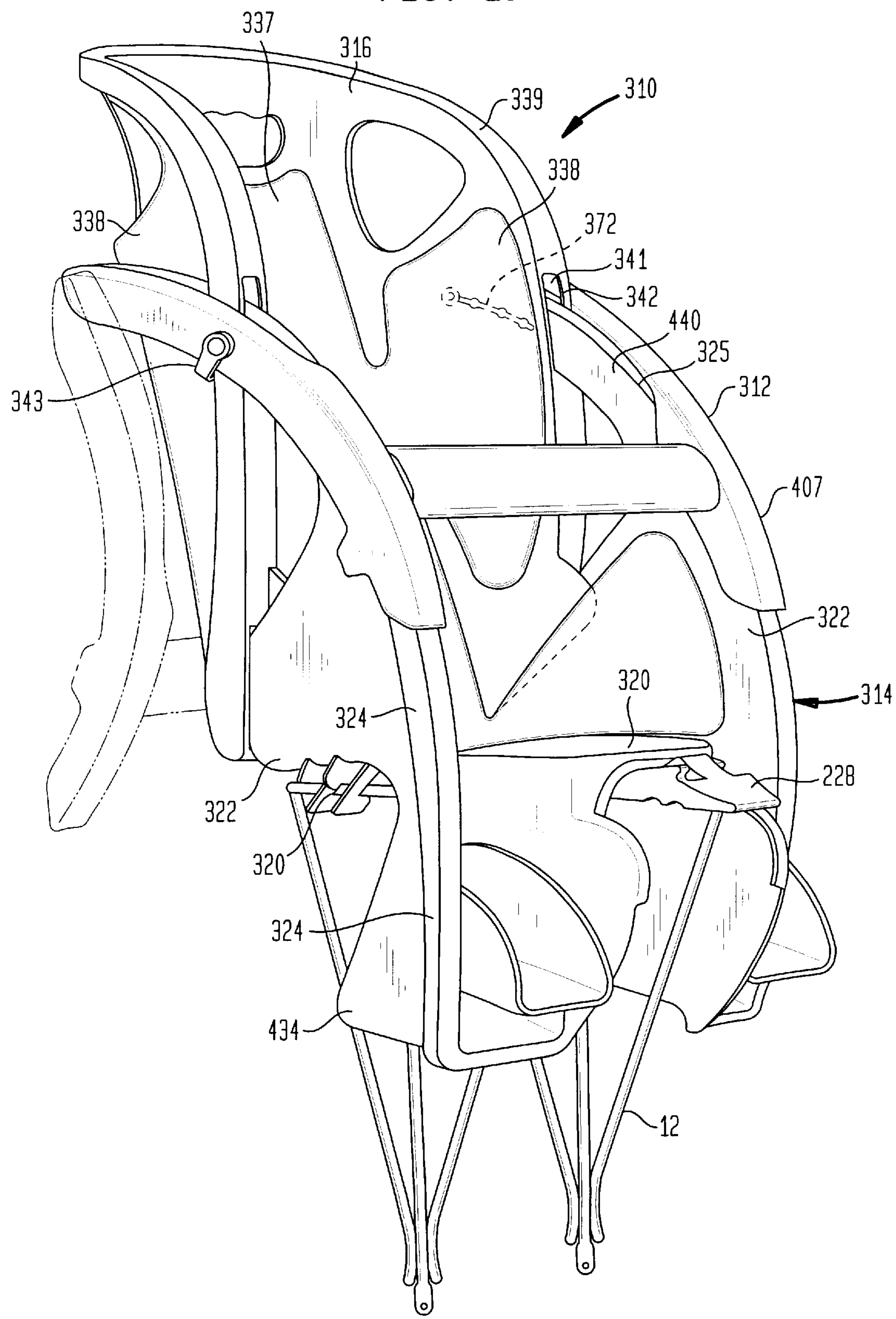
FIG. 10 shows the invention of FIG. 9 with the swing element in the seat stand position and with the swing element in the grab bar position in phantom.
Figure 11:
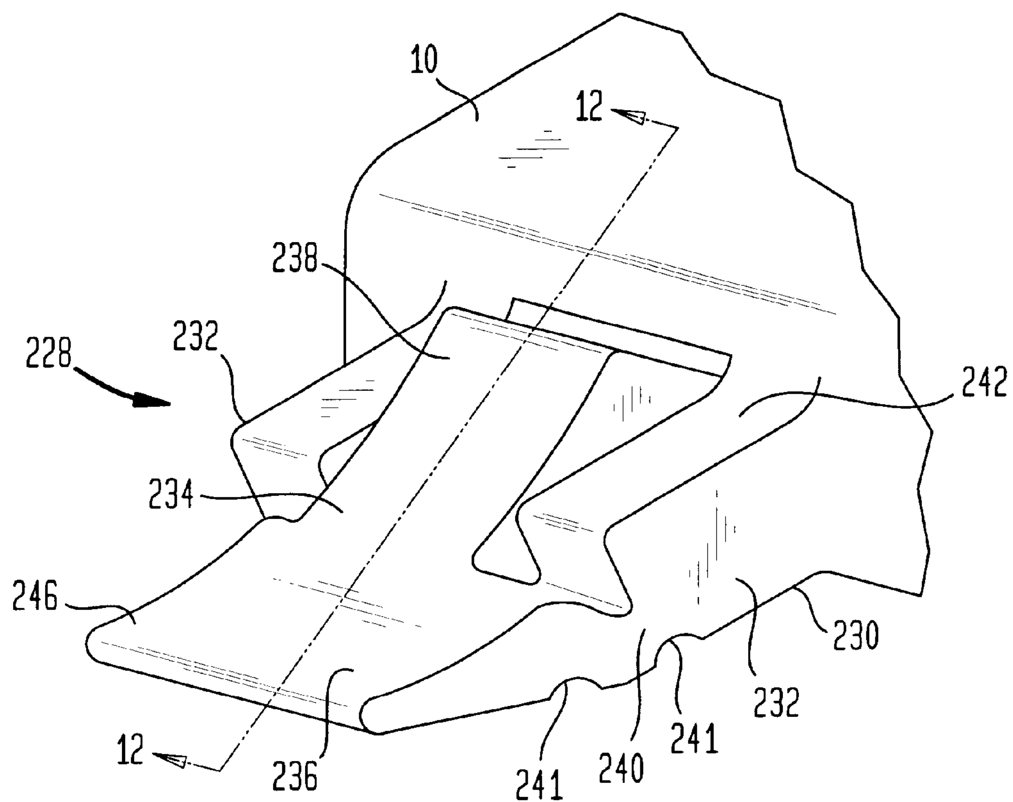
FIG. 11 is a perspective view of a second embodiment of the tongue assembly.

In the seat stand position, FIG. 10, the swing element 312 is secured behind the back wall 336 of the seat 310. A seat stand lock 420 (FIGS. 14 and 24) extends rearwardly from the base of the back wall 336. Preferably, the lock 420 extends from the end 422 of a rear biased latch 424. The biased latch 424 is similar in both structure and function to the latch 76 of the first embodiment 10.

The lock 420 is substantially U-shaped and acts as a spring for receiving the cross-bar 400. The outward end 426 of the lock 420 can be bent downwardly to receive the cross-bar 400 within the channel defined by the U-shaped lock 420. The lock outward end 426 may be provided with a tab or other finger engaging surface 427 to facilitate flexing of the lock 420 and removal and insertion of the cross-bar 400. Finally, the lock 420 is preferably integrally molded with the seat 310.

When the swing element 312 is in its seat stand position, the ends 413 of the swing arms 402 will engage a surface 432, such as the ground, on which the seat 310 is placed. The seat 310 may also contact the surface 432 along the heel area 434 (FIG. 10) of the seat portion 314. The overall arrangement securely stabilizes a child-occupied seat 310 removed from the bicycle rack and positioned on a flat surface in an upright position.

Figure 9:
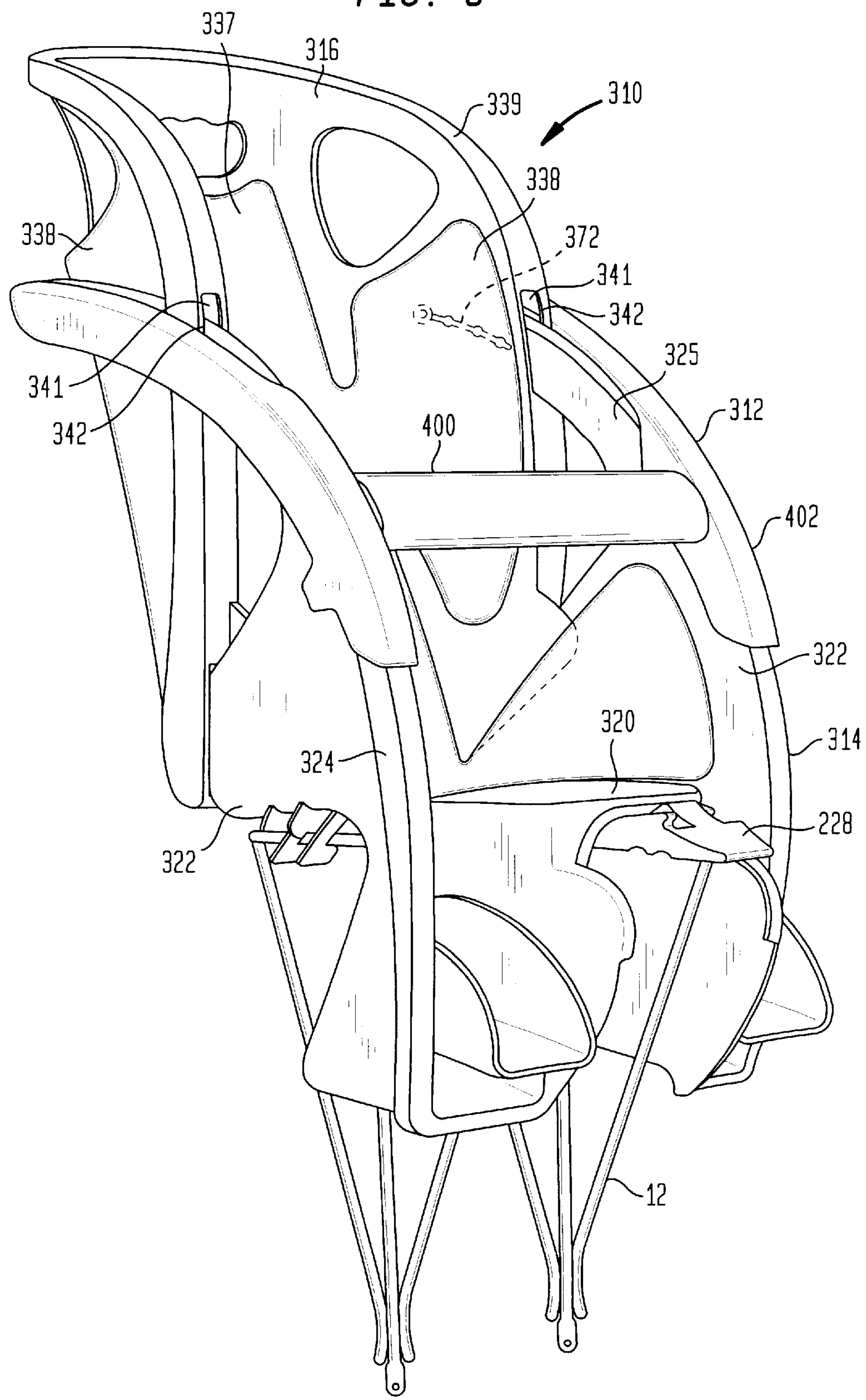
FIG. 9 shows a second embodiment of the child's bicycle seat assembled onto a touring rack with the swing element in the grab bar position.

In the grab bar position, FIG. 9, swing element 312 is secured on the front or seat side of the child seat. The bar 400 provides additional security as well as giving the child a gripping surface which should be comforting when the child feels off balance. The bar 400 also provides for the child protection from impact and provides stiffening support for the arms 402 when the swing element 312 is in the seat stand position. Finally, the grab bar 400 provides a surface for toy attachments for the child.

The inner sides 440 of the side arms 325 preferably have a narrowed section 442 (FIG. 25) to mate with and accommodate the inner side wall 407 of the swing arm 402 (FIG. 22). The U-shaped swing arm 402 is secured on the U-shaped side arm 325, with the mating U-shaped surfaces lying flush. This arrangement acts both as a placement guide for the swing arm 402 and as a safety feature by covering the edge along the inner side wall 407 of the swing arms 402.

Figure 25:
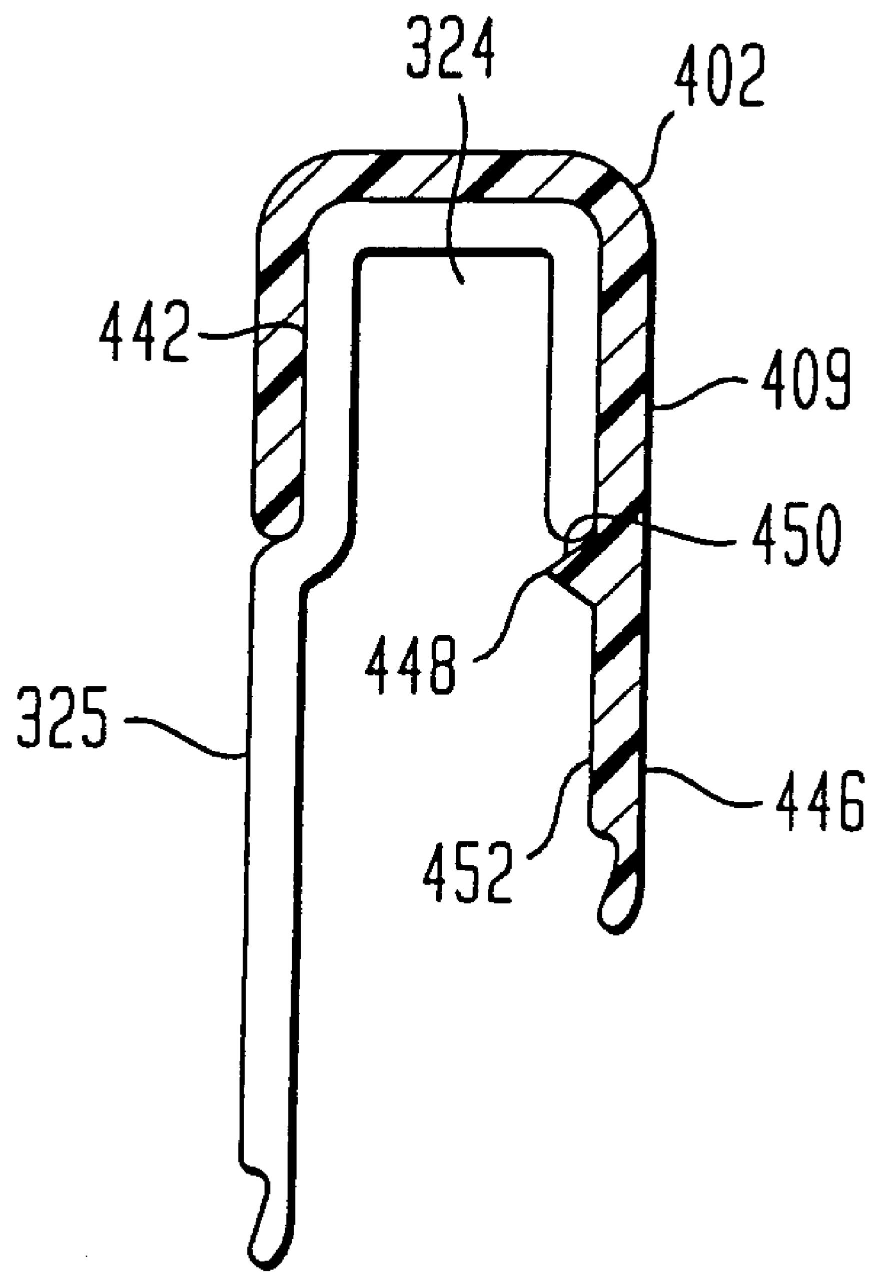
FIG. 25 is a cross-sectional view of the tab of FIG. 22 taken along the line 25—25.

A releasing and securing tab 446 is positioned on the exterior side wall 409 of the swing arm 402. The cross-section of the swing arms 402 including the tab 446 resembles an inverted "J", where the tab 446 forms the longer side (FIG. 25). A catch 448 projects inwardly from the tab 446 to engage the edge 450 of the channel 324. The catch 448 (phantom in FIG. 22) provides a snap fit engagement when the swing element 312 is secured on the side arms 325.

To release the swing element 312, the tabs 446 are pulled outwardly and upwardly until the catches 448 clear the edges 450. The tabs 446 should extend sufficiently below the channel 324 on the exterior side of the seat 310 to provide a finger engagement area 452 to facilitate gripping of the tab 446.

In the preferred embodiment, the swing element 312 is molded so that the distance between the respective tabs 446 is slightly less than the distance between the respective narrowed sections 442 when the cams are in a locked position. While the difference in distances is not substantial, it should be such that the exterior side walls 409 on the swing arms 402 in spring contact with the exterior side walls of the side arms 325. This arrangement further ensures the engagement of the tab catch 448 to the side arm edge 450. Also, the resultant additional frictional forces make it more difficult for a child to raise the swing element 312 from the locked grab bar position.

Finally, when rotating the swing element 312 from the grab bar arrangement to the seat stand position, or vice versa, the swing arms 402 should be sized and shaped to clear both the height and sides of the seat 310. The portions of the swing arms 402 which pass proximal to the backrest side walls 338 are appropriately narrowed. On the other hand, the portion of the swing arms 402 which engage the channels 324 have similar dimensions as the channels 324 to provide the desired frictional engagement when the swing element 312 is in the grab bar position.

The swing arms 402 include a cut-out section 460 in a reinforcing rib 461 shaped to receive the toggle assembly 343 when the swing element is in the grab bar position.

The bar 400 preferably comprises a plurality of reinforcing integrity ribs 462 integrally extending between the swing arms 402. The ribs 462 are also preferably encased in a cloth or foam 464 to avoid injury to the child. When the foam 464 is secured to the ribs 462, it defines a groove 466 as shown in FIG. 24.

Having described this invention in detail, those skilled in the art will appreciate that numerous modifications may be made hereof without departing from the spirit of this invention. For example, the swing element may be used on a bicycle seat without a side arm arrangement. With a series of discrete positions between the backrest and seat, corresponding engagement areas may be provided along the side wall of the seat. Also, one may provide a clip on the free end of the swing element to attach in a variety of possible locations which may also double as footpad. On the other hand, the swing bar design may be altered to form a two part seat belt style arrangement where rigid L-shaped elements may be adapted to swing from a grab bar to a seat stand position. Thus, it is not intended that the scope of this invention be limited to the single embodiment illustrated and described. Rather, it is intended that the scope of this invention be determined by the appended claims and their equivalents.

Figure 7:
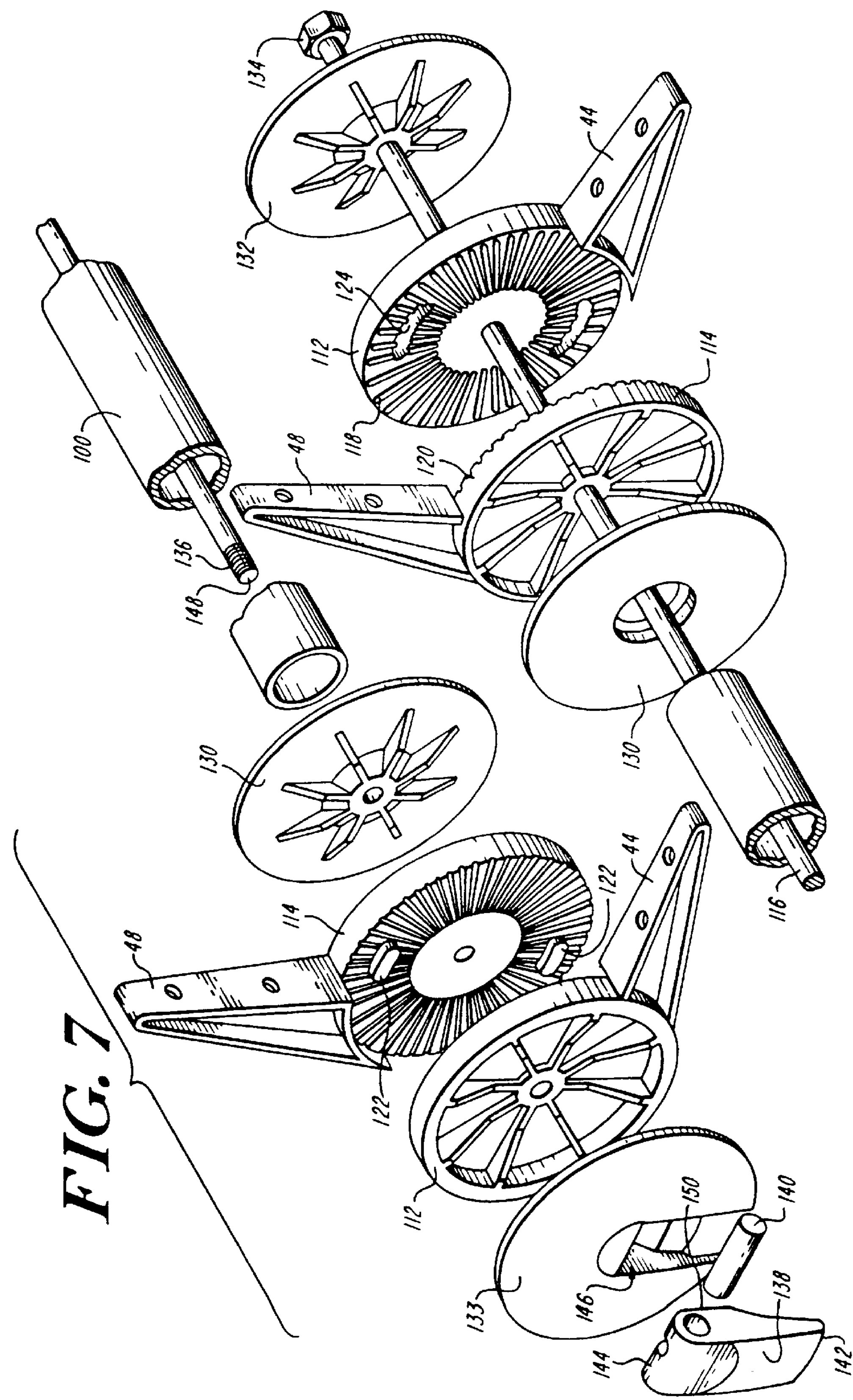
FIG. 7 is an exploded view of the hub assembly of FIG. 2.
Figure 8:
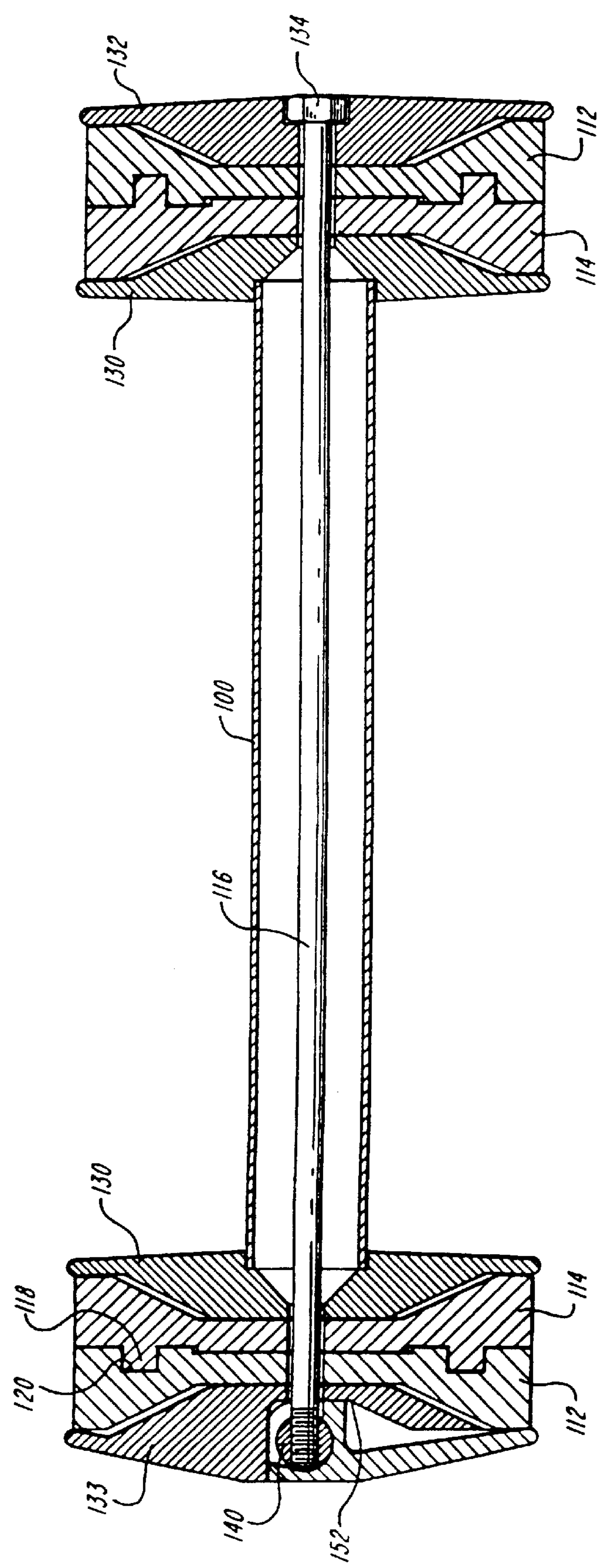
FIG. 8 is a cross-sectional view of the hub assembly of FIG. 2 along lines 8—8.

It should be understood that various changes and modifications of the embodiment shown in the drawings may be made within the scope of this invention. Other embodiments will be readily apparent to those of ordinary skill in the art. For example, the seat could have a design as shown in FIG. 1, with the swing element attached directly to the backrest. The attachment could be to the rear of the backrest using a hub arrangement such as is shown in FIGS. 7 and 8, wherein the hub would lock the swing element in the desired position. Alternatively, the arms of the swing element could be attached to the side walls of the backrest via a pivoting arrangement such as is shown between the arms and the side walls in the preferred embodiment. In this instance, the swing element could be locked in the grab bar position and seat stand position by friction fit arrangements between the swing element and the side walls of the seat portion. It should be understood, however, that various locking locations on the seat side walls would be required because adjusting the seat portion and backrest in relation to one another would change the position of contact between the swinging element and the seat side walls. Making such adjustments and locking arrangements are well within the ability of those of ordinary skill in the art. Moreover, one may provide a pivoting clip on the free end for securing to the side walls while doubling as a footpad when in the seat stand position.

Other arrangements for swing elements will be immediately apparent to those of ordinary skill in the art. As examples, the swing element could be attached to the seat portion instead of the backrest. The swing element also could be configured in two separate rigid L-shaped pieces, one extending from each side of the child's seat, but stopping short of meeting one another in the grab bar position. This arrangement (or others) could involve an attachment that permits the swing element to pivot upwardly and outwardly with respect to the seat portion, and then rotate about the sides of the seat portion rather than rotating over the top (or underneath) the seat portion. In any such arrangement, it is important only that the swing element be adapted to serve two functions, a grab bar in one position and a seat stand in another position.

Thus, it is intended that all matter contained in the above description are shown in the accompanying drawing shall be interpreted in an illustrative and not limiting sense.

What is claimed is:

1. In a child's seat adapted to be supported on a bicycle rack, the child's seat constructed and arranged to be removably secured to the bicycle rack, the child's seat including a locking mechanism for securing the child's seat to the bicycle rack, the improvement comprising:

a swing element having a grab bar, the swing element attached to the child's seat and movable between a grab bar position in which the grab bar is within reach of a child when seated in the child's seat and a seat stand position in which the swing element supports the child's seat in a sitting position on a flat surface, the swing element and the child's seat constructed and arranged to permit the swing element to be selectively secured in the grab bar position and the seat stand position, wherein the child's seat comprises a seat portion and a backrest attached to one another, and wherein the swing element is detachably secured to the seat portion in the grab bar position by locking interengagement of the swing element with the seat portion, the swing element being attached to the child's seat at a first location permitting the movement between the grab bar position and the seat stand position and wherein the engagement is at a second location remote from the first location, wherein the seat portion has seat side walls discrete from backrest side walls and wherein the swing element is pivotally attached to the seat side walls, and wherein the seat side walls include elongated portions extending upwardly and rearwardly relative to the seat portion, and wherein the swing element is pivotally attached to the elongated portions.

2. The improvement of claim 1 wherein the elongated portions are attached to the backrest.

3. A seat portion for a child's seat adapted to be detachably secured to a bicycle rack, comprising;

a seat base for supporting a child, and a pair of seat side walls, each seat side wall including a side wall base extending upwardly from the seat base and a pair of elongated side supports, one each extending upwardly and rearwardly from its respective side wall base, a backrest hingeably attached to said seat base, and means for releasably securing said side supports to said backrest in a plurality of positions so that said seat base and back rest are releasably securable in a plurality of angular relations to each other, said means comprising locking formations on said elongated side supports and corresponding locking formations on said backrest for interlocking with said locking formations on said side supports and means for biasing said locking formations on said backrest into engagement with said locking formations on said side supports.

4. A seat portion as claimed in claim 3 wherein the means for biasing comprises a cam and a lever for rotating the cam into a first position in which the cam biases the locking formations on said backrest into engagement with the locking formation on said side supports and a second position in which the respective formations are not engaged.

5. A child's seat as claimed in claim 4 further comprising a swing element attached to an elongated side support and movable into and out of a grab bar position, in which position the swing element assists in securing a child to the seat and is within reach of the child, the swing element being securable in the grab bar position.

6. A child's seat as claimed in claim 5 wherein the swing element is also movable to and securable in a seat stand position, in which position the swing element supports the child's seat in a sitting position on a flat surface.

7. A child's seat as claimed in claim 6 wherein the swing element is U-shaped.

8. A child's seat as claimed in claim 7 wherein the U-shaped swing element has two arms and a grab bar inter-connecting the arms, wherein the arms are attached to the elongated side supports, and wherein the swing element moves from the grab bar position to the seat stand position by rotation of the arms and movement of the grab bar over the back rest.

9. A child's seat as claimed in claim 5 wherein the swing element is U-shaped.

10. A child's seat as claimed in claim 3 wherein the elongated side supports are slideably engaged in slots in said backrest.

11. A child's seat as claimed in claim 5 wherein said swing element comprises means for releasably engaging said swing arm to said seat sidewalls when said swing element is in the grab bar position.

12. A child's seat as claimed in claim 11 wherein said means for releasably engaging comprises a catch which provides a snap-fit engagement with an edge of said seat sidewalls when the swing element is in the grab bar position.

13. In a child's seat, adapted to be removably supported on a bicycle rack having a plurality of struts, the child's seat including a locking structure for engagement with one of the struts, the improved locking structure comprising:

a base portion extending from the child's seat, the base portion defining an upwardly facing surface, and a latch having a lever portion and a strut engagement portion, the latch pivotally attached to the base portion by a hinge, wherein the strut engagement portion rests out of alignment with the surface in a strut engagement position when the hinge is unbiased; and wherein the locking structure is constructed and arranged so that an upward force on the lever portion biases the hinge so as to move the strut engagement portion downwardly toward the upwardly facing surface bringing the strut engagement portion out of the strut engagement position.

14. A locking structure as set forth in claim 13 wherein the latch includes an arm that extends downwardly and rearwardly with respect to the seat and that moves forwardly with respect to the seat when the lever is biased upwardly, whereby the arm will engage a strut and move the seat rearwardly when the lever is moved upwardly.

15. An assembly for attaching a child's bicycle seat to a bicycle comprising;

a bicycle rack having a plurality of struts including a first set of struts for securing the rack to a bicycle and a rear strut comprising a substantially horizontal member having an axis substantially transverse to the bicycle when the rack is positioned on the bicycle, a seat portion, a resilient latch on said seat portion comprising a downwardly and rearwardly sloping surface, a shoulder coupled to a rearward-most portion of the surface and defining a vertical surface extending upwardly from the rearward most portion of the sloping surface and an end section comprising a horizontal surface coupled to an uppermost portion of said shoulder and extending rearwardly therefrom, and wherein, when said child's seat is slid forward on said rack, said rear strut engages said surface and biases said surface upwards until said child's seat is in a position where said rear strut clears said shoulder, allowing said latch to snap back into an unbiased position whereby said child's seat is locked in position and prevented from moving rearwardly on said rack.

16. A child's bicycle seat as claimed in claim 15 wherein said means associated with the seat for securing the seat to a bicycle includes locking means for locking the biased latch in its normal, unbiased position thereby preventing unintentional flexing of the latch and disengagement of the latch from the rear end strut.

17. A child's seat as claimed in claim 16 wherein said child's seat comprises at least one grooved arm having a bottom surface extending above said latch and said locking means comprises a pin which can be wedged between the bottom surface of said arm and a top surface of said end portion of said latch.

18. In a child's seat adapted to be supported on a bicycle rack, the child's seat constructed and arranged to be removably secured to the bicycle rack, the child's seat including a locking mechanism for securing the child's seat to the bicycle rack, the improvement comprising:

a swing element having a grab bar, the swing element attached to the child's seat and movable between a grab bar position in which the grab bar is within reach of a child when seated in the child's seat and a seat stand position in which the swing element supports the child's seat in a sitting position on a flat surface, the swing element and the child's seat constructed and arranged to permit the swing element to be selectively secured in the grab bar position and the seat stand position, wherein the child's seat comprises a seat portion with seat side walls and a backrest portion with backrest side walls, the seat side walls discrete from the backrest side walls and wherein the swing element is pivotally attached to the seat side walls, wherein the seat side walls include elongated portions extending upwardly and rearwardly relative to the seat portion, and wherein the swing element is pivotally attached to the elongated portions, wherein the backrest is pivotally attached to the seat portion, and wherein the elongated portions are attached to the backrest.

19. A child's seat adapted to be detachably secured to a bicycle rack, comprising:

a seat base for supporting a child, a pair of seat side walls, each seat side wall including a side wall base extending upwardly from the seat base and a pair of elongated side supports, each of the pair extending upwardly and rearwardly from its respective side wall base, a backrest hingeably attached to the seat base and including backrest side walls discrete from the seat side walls, wherein each of the backrest side walls and a respective side support are attached to one another, moveable between a first attachment position with the seat base and the backrest secured at a first angular relationship and a second attachment position with the seat base and the backrest secured at a second angular relationship, and an opening in each of the backrest side walls through which a respective elongated side support extends.

20. The child's seat of claim 19, wherein the swing element is attached to the elongated side support of the child's seat.

21. A child's seat adapted to be detachably secured to a bicycle rack, comprising:

a seat base for supporting a child, a pair of seat side walls, each seat side wall including a side wall base extending upwardly from the seat base and a pair of elongated side supports, each of the pair extending upwardly and rearwardly from its respective side wall base, a backrest hingeably attached to the seat base and including backrest side walls discrete from the seat side walls, wherein each of the backrest side walls and a respective side support are attached to one another, moveable between a first attachment position with the seat base and the backrest secured at a first angular relationship and a second attachment position with the seat base and the backrest secured at a second angular relationship, and a swing element having a grab bar, the swing element attached to the child's seat and movable between a grab bar position in which the grab bar is within reach of a child when seated in the child's seat and a seat stand position in which the swing element supports the child's seat in a sitting position on a flat surface.

22. The child's seat of claim 21, wherein the swing element is attached to the elongated side support of the child's seat.

* * * * *